(12) United States Patent
Raman et al.

(10) Patent No.: US 10,970,269 B2
(45) Date of Patent: Apr. 6, 2021

(54) INTERMEDIATE CONSISTENCY LEVELS FOR DATABASE CONFIGURATION

(71) Applicant: Microsoft Technology Licensing, LLC, Redmond, WA (US)

(72) Inventors: Karthik Raman, Sammamish, WA (US); Arsalan Ahmad, Redmond, WA (US); Momin Mahmoud Al-Ghosien, Sammamish, WA (US); Mohammad Derakhshani, Duvall, WA (US); Madhan Gajendran, Bengaluru (IN); Ji Huang, Bothell, WA (US); Kiran Kumar Kolli, Redmond, WA (US); Sujit Vattathil Kuruvilla, Redmond, WA (US); Liang Li, Sammamish, WA (US); Denis Rystsov, Seattle, WA (US); Pankaj Sharma, Kirkland, WA (US); Dharma Shukla, Bellevue, WA (US); Hari Sudan Sundar, Redmond, WA (US); Shireesh Kumar Thota, Redmond, WA (US); Swarnim Vyas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/991,632

(22) Filed: May 29, 2018

(65) Prior Publication Data
US 2019/0342188 A1    Nov. 7, 2019

Related U.S. Application Data

(60) Provisional application No. 62/668,226, filed on May 7, 2018.

(51) Int. Cl.
*G06F 16/23*    (2019.01)
*G06F 16/27*    (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
CPC ...... G06F 16/27; G06F 16/903; G06F 16/219; G06F 16/2246; G06F 16/2272;
(Continued)

(56) References Cited

U.S. PATENT DOCUMENTS 5,446,880 A     8/1995  Balgeman et al.
5,581,753 A *  12/1996  Terry .................. G06F 16/2365
(Continued)

FOREIGN PATENT DOCUMENTS

CN    102497410 A    6/2012
CN    104935672 A    9/2015
(Continued)

OTHER PUBLICATIONS

Jeremy Likness, "Getting Behind the 9-Ball: Cosmos DB Consistency Levels Explained"; Mar. 23, 2018; Personal Blog; (Year: 2018).*

(Continued)

*Primary Examiner* — Backhean Tiv
*Assistant Examiner* — Jihad K Boustany
(74) *Attorney, Agent, or Firm* — Alleman Hall Creasman & Tuttle LLP

(57) ABSTRACT

Data services are often provided with consistency guarantees of either strong consistency models, comprising uniform wall-clock consistency, or eventual consistency models, where temporary logical inconsistency is guaranteed to be resolved only after full data propagation. However, the performance characteristics of contemporary services often require an intermediate consistency model, where some aspects of the service have specific consistency expectations (Continued)

and other aspects of the service are flexible, such as bounded staleness (e.g., a maximum delay in reaching consistency); session consistency (e.g., individual sessions remain logically consistent, but ordering may vary across sessions); and prefix consistency (e.g., each view during a session is logically consistent, but ordering may vary between session views). Service guarantees may involve a selection within a range of consistency models that includes one or more intermediate consistency levels, and server configurations may be selected and applied to fulfill the intermediate consistency level selected in the service level agreement.

16 Claims, 24 Drawing Sheets

(51) Int. Cl.
| | |
|---|---|
| G06F 11/20 | (2006.01) |
| G06F 16/22 | (2019.01) |
| G06F 16/2452 | (2019.01) |
| G06F 16/28 | (2019.01) |
| G06F 16/25 | (2019.01) |
| G06F 16/21 | (2019.01) |
| H04L 29/08 | (2006.01) |
| G06F 9/50 | (2006.01) |
| H04L 12/24 | (2006.01) |
| H04L 12/911 | (2013.01) |
| H04L 12/923 | (2013.01) |
| G06F 16/182 | (2019.01) |
| G06F 16/903 | (2019.01) |
| H04L 29/06 | (2006.01) |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(58) Field of Classification Search
CPC .. G06F 16/2452; G06F 16/2255; G06F 16/28; G06F 16/21; G06F 16/258; G06F 16/184; G06F 16/252; G06F 9/5077; G06F 11/2007; G06F 11/2023; G06F 11/2056; H04L 41/0803; H04L 41/0896; H04L 41/5009; H04L 41/5019; H04L 41/5022; H04L 41/5032; H04L 47/72; H04L 47/762; H04L 67/1008; H04L 67/1012; H04L 67/1034; H04L 69/24
See application file for complete search history.

(56) References Cited

U.S. PATENT DOCUMENTS

| | | |
|---|---|---|
| 5,581,754 A | 12/1996 | Terry et al. |
| 5,787,262 A | 7/1998 | Shakib et al. |
| 5,923,850 A | 7/1999 | Barroux |
| 6,523,032 B1 | 2/2003 | Sunkara et al. |
| 6,535,874 B2 | 3/2003 | Purcell |
| 6,925,457 B2 | 8/2005 | Britton et al. |
| 7,117,221 B2 | 10/2006 | Hahn et al. |
| 7,269,648 B1 | 9/2007 | Krishnan et al. |
| 7,509,354 B2 | 3/2009 | McGarvey |
| 7,606,838 B2 | 10/2009 | Tobies |
| 7,689,599 B1 | 3/2010 | Shah et al. |
| 7,751,331 B1 | 7/2010 | Blair et al. |
| 7,774,473 B2 | 8/2010 | Elving et al. |
| 7,877,644 B2 | 1/2011 | Stenzel |
| 8,311,981 B2 | 11/2012 | Braginsky et al. |
| 8,326,807 B2 | 12/2012 | Aiyer et al. |
| 8,386,421 B2 | 2/2013 | Reid et al. |
| 8,392,482 B1 | 3/2013 | McAlister et al. |
| 8,572,022 B2 | 10/2013 | Hagan et al. |
| 8,595,267 B2 | 11/2013 | Sivasubramanian et al. |
| 8,694,639 B1 * | 4/2014 | Vermeulen ............ G06F 9/5011 709/226 |
| 8,719,313 B2 | 5/2014 | Swett et al. |
| 8,745,127 B2 | 6/2014 | Gopal et al. |
| 8,824,286 B2 | 9/2014 | Lee et al. |
| 8,862,588 B1 | 10/2014 | Gay et al. |
| 8,880,508 B2 | 11/2014 | Jeong et al. |
| 8,943,180 B1 | 1/2015 | Petit-Huguenin |
| 8,972,491 B2 | 3/2015 | Abu-Libdeh et al. |
| 9,026,493 B1 | 5/2015 | Weng |
| 9,195,725 B2 | 11/2015 | Brown et al. |
| 9,219,686 B2 | 12/2015 | Hilt et al. |
| 9,225,770 B2 | 12/2015 | Wang et al. |
| 9,230,040 B2 | 1/2016 | Shukla et al. |
| 9,244,926 B2 | 1/2016 | Kakivaya et al. |
| 9,292,566 B2 | 3/2016 | Golab et al. |
| 9,356,793 B1 | 5/2016 | Drobychev et al. |
| 9,405,474 B2 | 8/2016 | Shukla et al. |
| 9,411,873 B2 | 8/2016 | Rath et al. |
| 9,460,129 B2 | 10/2016 | Mann |
| 9,462,427 B2 | 10/2016 | Patel et al. |
| 9,471,711 B2 | 10/2016 | Abadi et al. |
| 9,569,513 B1 | 2/2017 | Vig et al. |
| 9,619,261 B2 | 4/2017 | Gaurav et al. |
| 9,632,828 B1 * | 4/2017 | Mehta ................. G06F 16/2343 |
| 9,645,835 B2 | 5/2017 | Phillips et al. |
| 9,781,124 B2 | 10/2017 | Goldberg et al. |
| 9,888,067 B1 | 2/2018 | Yemini et al. |
| 10,552,443 B1 | 2/2020 | Wu et al. |
| 2002/0035642 A1 | 3/2002 | Clarke et al. |
| 2002/0161757 A1 | 10/2002 | Mock et al. |
| 2003/0037283 A1 | 2/2003 | Srinivasan et al. |
| 2003/0046396 A1 | 3/2003 | Richter et al. |
| 2003/0135643 A1 | 6/2003 | Chiu et al. |
| 2003/0220966 A1 | 11/2003 | Hepper et al. |
| 2004/0230571 A1 | 11/2004 | Robertson |
| 2004/0236801 A1 | 11/2004 | Borden et al. |
| 2005/0138170 A1 | 6/2005 | Cherkasova et al. |
| 2005/0160133 A1 | 7/2005 | Greenlee et al. |
| 2006/0106879 A1 | 5/2006 | Zondervan et al. |
| 2006/0155945 A1 | 7/2006 | Mcgarvey |
| 2006/0224773 A1 | 10/2006 | Degenaro et al. |
| 2006/0282836 A1 | 12/2006 | Barker |
| 2007/0073675 A1 | 3/2007 | Kaar et al. |
| 2008/0147627 A1 | 6/2008 | Natkovich et al. |
| 2008/0301025 A1 | 12/2008 | Boss et al. |
| 2009/0248737 A1 | 10/2009 | Shukla et al. |
| 2010/0082630 A1 | 4/2010 | Zagelow et al. |
| 2010/0094838 A1 | 4/2010 | Kozak |
| 2011/0149743 A1 | 6/2011 | Agarwal et al. |
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |

(56) References Cited

U.S. PATENT DOCUMENTS

| | | |
|---|---|---|
| 2013/0232153 A1 | 9/2013 | Dhuse et al. |
| 2013/0254164 A1 | 9/2013 | Tsofi et al. |
| 2014/0052761 A1 | 2/2014 | Teitelbaum |
| 2014/0101298 A1* | 4/2014 | Shukla ............... H04L 41/5006 709/223 |
| 2014/0195514 A1 | 7/2014 | Stein |
| 2014/0279844 A1 | 9/2014 | Shukla et al. |
| 2014/0297776 A1 | 10/2014 | Volvovski et al. |
| 2014/0304371 A1* | 10/2014 | Mraz ...................... H04L 63/02 709/219 |
| 2014/0359348 A1 | 12/2014 | Volvovski et al. |
| 2015/0026189 A1 | 1/2015 | Li et al. |
| 2015/0154074 A1 | 6/2015 | Resch et al. |
| 2015/0195162 A1 | 7/2015 | Gandham et al. |
| 2015/0269239 A1 | 9/2015 | Swift et al. |
| 2015/0304983 A1 | 10/2015 | Krening et al. |
| 2016/0034433 A1 | 2/2016 | Yamat et al. |
| 2016/0321588 A1 | 11/2016 | Das et al. |
| 2016/0342645 A1 | 11/2016 | Tempero et al. |
| 2017/0068713 A1 | 3/2017 | Joshi et al. |
| 2017/0123948 A1 | 5/2017 | Dhuse et al. |
| 2017/0199770 A1 | 7/2017 | Peteva et al. |
| 2017/0201597 A1 | 7/2017 | Narasimhan et al. |
| 2017/0220651 A1 | 8/2017 | Mathew et al. |
| 2017/0286180 A1 | 10/2017 | He et al. |
| 2017/0293540 A1 | 10/2017 | Mehta et al. |
| 2017/0308562 A1 | 10/2017 | Sreekantaiah et al. |
| 2017/0308601 A1* | 10/2017 | Massarenti ............. G06F 16/27 |
| 2017/0318085 A1 | 11/2017 | Shukla et al. |
| 2017/0364345 A1 | 12/2017 | Fontoura et al. |
| 2018/0150331 A1 | 5/2018 | Chen et al. |
| 2018/0316752 A1 | 11/2018 | Hodges et al. |
| 2019/0163391 A1* | 5/2019 | Annamalai ........... G06F 3/0647 |
| 2019/0166019 A1 | 5/2019 | Jagadeesh |
| 2019/0171737 A1 | 6/2019 | Duan et al. |
| 2019/0196878 A1* | 6/2019 | Li ....................... H04L 41/5003 |
| 2019/0340166 A1 | 11/2019 | Raman et al. |
| 2019/0340167 A1 | 11/2019 | Raman et al. |
| 2019/0340168 A1 | 11/2019 | Raman et al. |
| 2019/0340265 A1 | 11/2019 | Raman et al. |
| 2019/0340273 A1 | 11/2019 | Raman et al. |
| 2019/0340291 A1 | 11/2019 | Raman et al. |
| 2019/0342379 A1 | 11/2019 | Shukla et al. |
| 2019/0342380 A1 | 11/2019 | Thota et al. |

FOREIGN PATENT DOCUMENTS

| | | | |
|---|---|---|---|
| WO | 9735270 | A1 | 9/1997 |
| WO | 2008100795 | A1 | 8/2008 |
| WO | 2010048595 | A2 | 4/2010 |

OTHER PUBLICATIONS

"Consistency as a Service: Auditing Cloud Consistency", by Qin Lin, Guojun Wang, Jie Wu; IEEE Transactions on Network aAnd Service Management vol. 11 No. 1 Year 2014 (Year: 2014).*
"Conflict Resolution", Retreived from https://web.archive.org/web/20120402192233/https://docs.oracle.com/cd/E11882_01/server.112/e10706/repconflicts.htm, Apr. 2, 2012, 28 Pages.
"Conflict Resolution", Retrieved from https://docs.oracle.com/cd/F49540_01/DOC/server.815/a67791/ch6.htm, Retrieved Date: Aug. 31, 2018, 43 Pages.
"Conflict Resolution Concepts and Architecture", Retrieved from https://docs.oracle.com/cd/B10500_01/server.920/a96567/repconflicts.htm, Nov. 15, 2011, 35 Pages.
"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.
"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.
"Master-master vs Master-slave Database Architecture?", Retrieved from https://stackoverflow.com/questions/3736969/master-master-vs-master-slave-database-architecture, Retrieved Date: Jul. 2, 2018, 8 Pages.
"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.
"Replica Set Elections", Retrieved from https://docs.mongodb.com/manual/core/replica-set-elections/, Retrieved Date: Jul. 2, 2018, 6 Pages.
Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.
Ardagna, et al., "SLA Based Resource Allocation Policies in Autonomic Environments", In Journal of Parallel and Distributed Computing, vol. 67, Issue 3, Mar. 1, 2007, pp. 259-270.
Fernandez, et al., "Autoscaling Web Applications in Heterogeneous Cloud Infrastructures", In Proceedings of IEEE International Conference on Cloud Engineering, Mar. 11, 2014, 11 Pages.
Gunda, et al., "Multi-master at global scale with Azure Cosmos DB", Retrieved from https://docs.microsoft.com/en-us/azure/cosmos-db/multi-region-writers, May 7, 2018, 9 Pages.
Liu, et al., "Consistency as a Service: Auditing Cloud Consistency", In Journal of IEEE Transactions on Network and Service Management, vol. 11, Issue 1, Mar. 2014, pp. 25-35.
Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.
Patra, Chandan, "How to Use Consistency Models for Amazon Web Services", Retrieved from https://cloudacademy.com/blog/consistency-models-of-amazon-cloud-services/, Jun. 3, 2016, 9 Pages.
Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.
Singh, et al., "Server-Storage Virtualization: Integration and Load Balancing in Data Centers", In Proceedings of ACM/IEEE Conference on Supercomputing, Nov. 15, 2008, 12 Pages.
Thomsen, Jakob Holdgaard, "UBER Engineering: The Architecture of Schemaless, Uber Engineering's Trip Datastore Using MySQL", Retrieved from https://eng.uber.com/schemaless-part-two/, Jan. 15, 2016, 8 Pages.
"International Search Report and Written Opinion Issued in PCT Application No. PCT/US2019/031207", dated Jul. 19, 2019, 13 Pages.
"International Search Report and Written Opinion Issued in PCT Application No. PCT/US2019/031204", dated Jul. 19, 2019, 14 Pages.
"International Search Report and Written Opinion Issued in PCT Application No. PCT/US2019/031208", dated Jul. 24, 2019, 15 Pages.
"Non Final Office Action Issued in U.S. Appl. No. 15/991,953", dated Aug. 22, 2019, 21 Pages.
Xue, et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.
Non-Final Office Action Issued in U.S. Appl. No. 15/991,786, dated May 8, 2020, 36 Pages.
Non-Final Office Action Issued in U.S. Appl. No. 15/991,880, dated Jun. 10, 2020, 37 Pages.
Buckler, Craig, "Flow to Convert XML to a JSON-Like JavaScript Object", Retrieved From: http://www.sitepoint.com/how-to-convert-xml-to-a-javascript-object, Oct. 20, 2011, 9 Pages.
Chan, et al., "Taming XPath Queries by Minimizing Wildcard Steps", In Proceedings of the 30th VLDB Conference, Aug. 31, 2004, pp. 156-167.

(56) References Cited

OTHER PUBLICATIONS

He, et al., "Query Language and Access Methods for Graph Databases", In Book Managing and Mining Graph Data, 2010, pp. 125-160.

Kossmann, Donald, "The State of the Art in Distributed Query Processing", In ACM Computing Surveys, vol. 32, No. 4, Dec. 2000, pp. 422-469.

Kraska, et al., "Consistency Rationing in the Cloud: Pay only when it Matters", In Proceedings of the Very Large Data Bases Endowment, vol. 2, Issue 1, Aug. 24, 2009, 12 Pages.

Lim, et al., "Automated Control for Elastic Storage", In Proceedings of the 7th International Conference on Autonomic Computing, Jun. 7, 2010, pp. 1-10.

Moon, et al., "Introducing SSDs to the Hadoop MapReduce Framework", In Proceedings of 7th International Conference on Cloud Computing, Jun. 27, 2014, pp. 272-279.

"Non Final Office Action Issued in U.S. Appl. No. 15/991,953", dated Jul. 16, 2020, 24 Pages.

"Final Office Action Issued in U.S. Appl. No. 15/991,786", dated Oct. 23, 2020, 16 Pages.

"Notice of Allowance Issued in U.S. Appl. No. 15/991,062", dated Mar. 18, 2020, 9 Pages.

"Non Final Office Action Issued in U.S. Appl. No. 15/991,223", dated Apr. 9, 2020, 15 Pages.

"Final Office Action Issued in U.S. Appl. No. 15/991,953", dated Feb. 14, 2020, 24 Pages.

Montazerolghaem, et al., "Overload Control in SIP Networks: A Heuristic Approach Based on Mathematical Optimization", In Proceedings of the IEEE Global Communications Conference, Dec. 6, 2015, 6 Pages.

* cited by examiner

```
------------------------------ MODULE cosmos ------------------------------
(***************************************************************************)
(* Microsoft Azure Cosmos DB TLA+ specification in PlusCal                 *)
(*                                                                         *)
(* The spec includes 5 consistency levels (see CONSTANT Consistency) and   *)
(* their correctness checks (see end of the file).                         *)
(* The main algorithm is between "algorithm {" and "}"                     *)
(* Some utility functions are in model Library                             *)
(***************************************************************************)

EXTENDS Naturals, Integers, Sequences, FiniteSets, TLC, Bags, Library (***************************************************************************)
(* N the set of servers within each region                                 *)
(***************************************************************************)
CONSTANT N (***************************************************************************)
(* NumRegions number of Regions                                            *)
(***************************************************************************)
CONSTANT NumRegions (***************************************************************************)
(* NumClients number of Clients                                            *)
(***************************************************************************)
CONSTANT NumClients (***************************************************************************)
(* NumOps number of operations for each client                             *)
(***************************************************************************)
CONSTANTS NumOps (***************************************************************************)
(* Consistency level                                                       *)
(* (1) strong (Linearizability)                                            *)
(* (2) bounded (Bounded Staleness)                                         *)
(* (3) session                                                             *)
(* (4) prefix (Consistent Prefix)                                          *)
(* (5) eventual                                                            *)
(***************************************************************************)
CONSTANT Consistency (* The bounded version differences in Bounded Staleness consistency *)
CONSTANT Bound ASSUME /\ N \in Nat
       /\ NumRegions \in Nat
       /\ NumClients \in Nat
       /\ NumOps \in Nat
       /\ Consistency \in {"strong", "bounded", "session", "prefix", "eventual"}
       /\ Bound \in Nat Regions == 1..NumRegions
Servers == {<<i,j>> : i \in Regions, j \in 1..N}
Primaries == {<<i,1>> : i \in Regions}
Secondaries == {<<i,j>> : i \in Regions, j \in 2..N}
(* The primary in write region *)
Master == CHOOSE p \in Primaries : p[1] = 1
Clients == {<<0, i>> : i \in 1..NumClients}
Operations == 1..NumOps (***************************************************************************)
(* All possible protocol messages                                          *)
(***************************************************************************)
Messages == [type: {"replication"}, lsn: Nat, clsn: Nat, src: Servers]
    \union [type: {"ack"}, lsn: Nat, src: Servers]
    \union [type: {"write"}, src: Clients, op: Operations]
    \union [type: {"read"}, src: Clients, op: Operations]
    \union [type: {"read_reply"}, lsn: Nat, clsn: Nat, src: Servers, op: Operations]
    \union [type: {"write_reply"}, lsn: Nat, clsn: Nat, src: Servers, op: Operations]
```

```
------------------------------ MODULE Library ------------------------------
EXTENDS Naturals, Integers, Sequences, FiniteSets, Bags (***************************************************************************)
(* Value functions                                                         *)
(***************************************************************************)
max(x, y) == IF x>y THEN x ELSE y min(x, y) == IF x<y THEN x ELSE y (***************************************************************************)
(* Set functions                                                           *)
(***************************************************************************)
SetNone(S) == CHOOSE x : x \notin S SetPick(S) == CHOOSE e \in S : TRUE SetMax(S) == IF S = {} THEN -1
             ELSE CHOOSE i \in S : \A j \in S : i >= j SetMin(S) == IF S = {} THEN -1
             ELSE CHOOSE i \in S : \A j \in S : i <= j RECURSIVE SetSum(_)
SetSum(S) == IF S={} THEN 0
             ELSE LET s == CHOOSE x \in S : TRUE
                  IN s + SetSum(S \ {s})

SetSort(S) == LET D == 1..Cardinality(S)
              IN {seq \in [D -> S] : /\ S \subseteq {seq[i] : i \in D}
                                     /\ \A i,j \in D : (i < j) => (seq[i].key <= seq[j].key)}

(***************************************************************************)
(* Bag functions                                                           *)
(***************************************************************************)
BagAdd(B, e) == B (+) (e :> 1)

BagRemove(B, e) == B (-) (e :> 1)

(***************************************************************************)
(* Map functions                                                           *)
(***************************************************************************)
(* Adding a key-value mapping (kv[1] is the key, kv[2] the value) to a map *)
f ++ kv == [x \in DOMAIN f \union {kv[1]} |-> IF x = kv[1] THEN kv[2] ELSE f[x]]

(* The image of a map *)
Image(f) == {f[x] : x \in DOMAIN f}

IsBijection(f, X, Y) == /\ DOMAIN f = X
                        /\ Image(f) = Y
                        /\ \A x,y \in X : x # y => f[x] # f[y]
                        /\ \A y \in Y : \E x \in X : f[x] = y IsInjective(f) == \A x,y \in DOMAIN f : x # y => f[x] # f[y]

(***************************************************************************)
(* Sequence functions                                                      *)
(***************************************************************************)
Last(s) == s[Len(s)]

(*
SeqMax(S) == IF S = <<>> THEN -1
             ELSE LET i == CHOOSE i \in DOMAIN S : \A j \in DOMAIN S : S[i] >= S[j]
                  IN S[i]
*)

SeqMax(S) == SetMax(Image(S))

SeqMin(S) == SetMin(Image(S))

RECURSIVE SeqSum(_)
SeqSum(S) == IF S = <<>> THEN 0
             ELSE Head(S) + SeqSum(Tail(S))
```

FIG. 14J

```
IsIncreasing(f) == \A x,y \in DOMAIN f : x <= y => f[x] <= f[y]

IsSubSequence(s1, s2) == \E f \in [DOMAIN s1 -> DOMAIN s2] : /\ IsInjective(f)
                                                              /\ IsIncreasing(f)
                                                              /\ \A i \in DOMAIN s1 : s1[i] = s2[f[i]]

\* Sequences with no duplicates:
RECURSIVE NoDupRec(_,_)
NoDupRec(es, seen) == IF es = <<>> THEN TRUE
                      ELSE IF es[1] \in seen THEN FALSE
                           ELSE NoDupRec(Tail(es), seen \cup {es[1]})

NoDup(es) == NoDupRec(es,{})

NoDupSeq(E) == {es \in Seq(E) : NoDup(es)}

\* Removing duplicates from a sequence:
RECURSIVE RemDupRec(_,_)
RemDupRec(es, seen) == IF es = <<>> THEN <<>>
                       ELSE IF es[1] \in seen THEN RemDupRec(Tail(es), seen)
                            ELSE <<es[1]>> \o RemDupRec(Tail(es), seen \cup {es[1]})
RemDup(es) == RemDupRec(es, {})

\* Sequence prefix:
Prefix(s1,s2) == Len(s1) <= Len(s2) /\ \A i \in DOMAIN s1 : s1[i] = s2[i]

\* The longest common prefix of two sequences:
RECURSIVE LongestCommonPrefixLenRec(_,_,_)
LongestCommonPrefixLenRec(S,n,el) == IF S = {} THEN 0
                                     ELSE IF /\ \A s \in S : Len(s) >= n + 1
                                             /\ \A s \in S : s[n+1] = el[n+1]
                                          THEN LongestCommonPrefixLenRec(S, n+1, el)
                                          ELSE n LongestCommonPrefixLenSet(S) == LongestCommonPrefixLenRec(S, 0, SetPick(S))

LongestCommonPrefix(S) == LET n == LongestCommonPrefixLenSet(S)
                         IN IF n = 0 THEN <<>>
                            ELSE [i \in 1..LongestCommonPrefixLenSet(S) |-> SetPick(S)[i]]
```

FIG. 14K

INTERMEDIATE CONSISTENCY LEVELS FOR DATABASE CONFIGURATION

CROSS-REFERENCE TO RELATED APPLICATIONS

This application is a continuation of, and claims priority under 35 U.S.C. §§ 119-120 to, U.S. Patent Application No. 62/668,226, entitled "DISTRIBUTED DATABASES," filed on May 7, 2018, the entirety of which is hereby incorporated by reference as if fully rewritten herein.

BACKGROUND

Within the field of computing, many scenarios involve a data service comprising a server set of servers that provide a data set. The servers may include a set of replicas that store copies of the data set. The data service may fulfill read and write queries at the request of clients distributed across a range of regions, including a worldwide distribution, and the replicas may be similarly distributed to enable a query to be fulfilled in a rapid manner by a nearby server.

The replicas may utilize techniques to synchronize a write of a value to the data set with other replicas, such that a subsequent read from a replica produces the most recently written value. An ideal server set may strive to maintain strict concurrency in which all replicas remain continuously synchronous, such that a read from any replica at any time produces the same value. However, due to a variety of events, such as concurrency conflicts, faults within the server set such as server failures and network outages, and propagation delays due to the limits of communication speed, complete synchrony may not be achievable, initiating the same read query from two replicas at the same time may produce a different from each replica. Strict concurrency may be achieved by consulting all replicas to a consensus; however, a large and widely distributed data set may feature thousands of servers, and achieving consensus may be a protracted and computationally expensive process.

Some applications may depend upon strong consistency that is achievable by this technique, and the data service may be configured to provide a guarantee of strong consistency. However, many applications may be more sensitive to the latency incurred by the consensus process than to consistency violations. For such applications, the data service may be configured to exhibit eventual consistency, wherein each replica eventually reflects a correct sequence of writes for a value, but where no guarantees are provided as to when such consistency may occur. As a result, a read issued to any replica may be fulfilled by an out-of-sequence value due to incomplete synchronization of the selected replica with other replicas of the server set. By offering a choice between strong consistency and eventual consistency, the data service may present a selection of consistency levels that may be suitable for different applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A data service that offers a choice between strong consistency and eventual consistency may be suitable for some applications. However, for a wide range of applications, neither choice may be desirable. Strong consistency may incur extensive latency due to a dependency on achieving consensus over all replicas, and the latency may be exacerbated at scale, such as a global consensus that is to be achieved over thousands of replicas distributed around the world for each read query. While eventual consistency provides low latency, the large variance in inconsistent results returned from each replica may exceed an inconsistency tolerance of the application. Again, such inconsistency may be exacerbated at scale, as the synchronization across a large number of replicas may take quite a while, and in the meantime a variety of values may be provided for a read query issued to different replicas. Clients of the data service may therefore have to choose between a strong consistency level that is excessively slow and expensive and an eventual consistency level that is quick but excessively inconsistent, neither of which may be sufficient for the application of the client.

In view of these unappealing options, a data service may offer to clients a consistency level set that includes at least one intermediate consistency level that is less strict than strong consistency and more strict than eventual consistency. Some data services may provide a selection of three intermediate consistency levels: a bounded staleness consistency level that guarantees consistency of values read from the data set except within a bounded interval of latest writes; a session consistency level that guarantees consistency of values provided to a session, wherein a sequence of writes of the value remains consistent over a sequence of session views of the session; and a prefix consistency level that guarantees consistency up to a particular time boundary, although the particular time boundary may change a sequence of session views of the session. All three intermediate consistency levels may reflect a consistency level option that is less strict than a strong consistency level, in which reads are fulfilled with lower latency and lower computational expense, and also more strict than an eventual consistency level, in which no guarantees of consistency are provided. A client may submit a service level agreement that selects an intermediate consistency level, and the data service may fulfill the service level agreement for the client by selecting and applying, to the respective servers of the server set, a server configuration for the intermediate consistency level.

Presented herein are techniques for incorporating intermediate consistency levels in a consistency level set offered by a data service, and that may be selected for an application by a service level agreement and applied through the configuration of the servers of the server set. A description of a range of intermediate consistency levels is presented, as well as details of the server configurations that may be utilized to achieve and fulfill the respective intermediate consistency levels over the server set.

A first embodiment of the presented techniques involves a server of a server set that provides access to a data set. The server comprises a processor and memory storing instructions that, when executed by the processor, cause the server to define a consistency level set comprising at least one intermediate consistency level that is less strict than a strong consistency level and more strict than an eventual consistency level; receive a service level agreement that selects an intermediate consistency level from the consistency level set; and select a server configuration of the server that fulfills the intermediate consistency level selected in the service level agreement.

A second embodiment of the presented techniques involves a method of configuring a server set to provide a data set. The method comprises defining a consistency level set comprising at least one intermediate consistency level that is less strict than a strong consistency level and more strict than an eventual consistency level; for the data set, receiving a service level agreement that selects the intermediate consistency level from the consistency level set; selecting a service configuration that fulfills the intermediate consistency level selected in the service level agreement; and allocating and configuring a server of the server set according to the service configuration.

A third embodiment of the presented techniques involves a method of configuring a server set to provide a data set. The method comprises defining a consistency set level comprising: a strong consistency level; a set of intermediate consistency levels comprising a bounded staleness consistency level, a session consistency level, and a consistent prefix consistency level; and an eventual consistency level. The method further comprises, the data set, receiving a service level agreement including a consistency level selected from the consistency level set; selecting a service configuration that fulfills the consistency level selected in the service level agreement; and allocating and configuring a server of the server set according to the service configuration.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

Figure 14D:
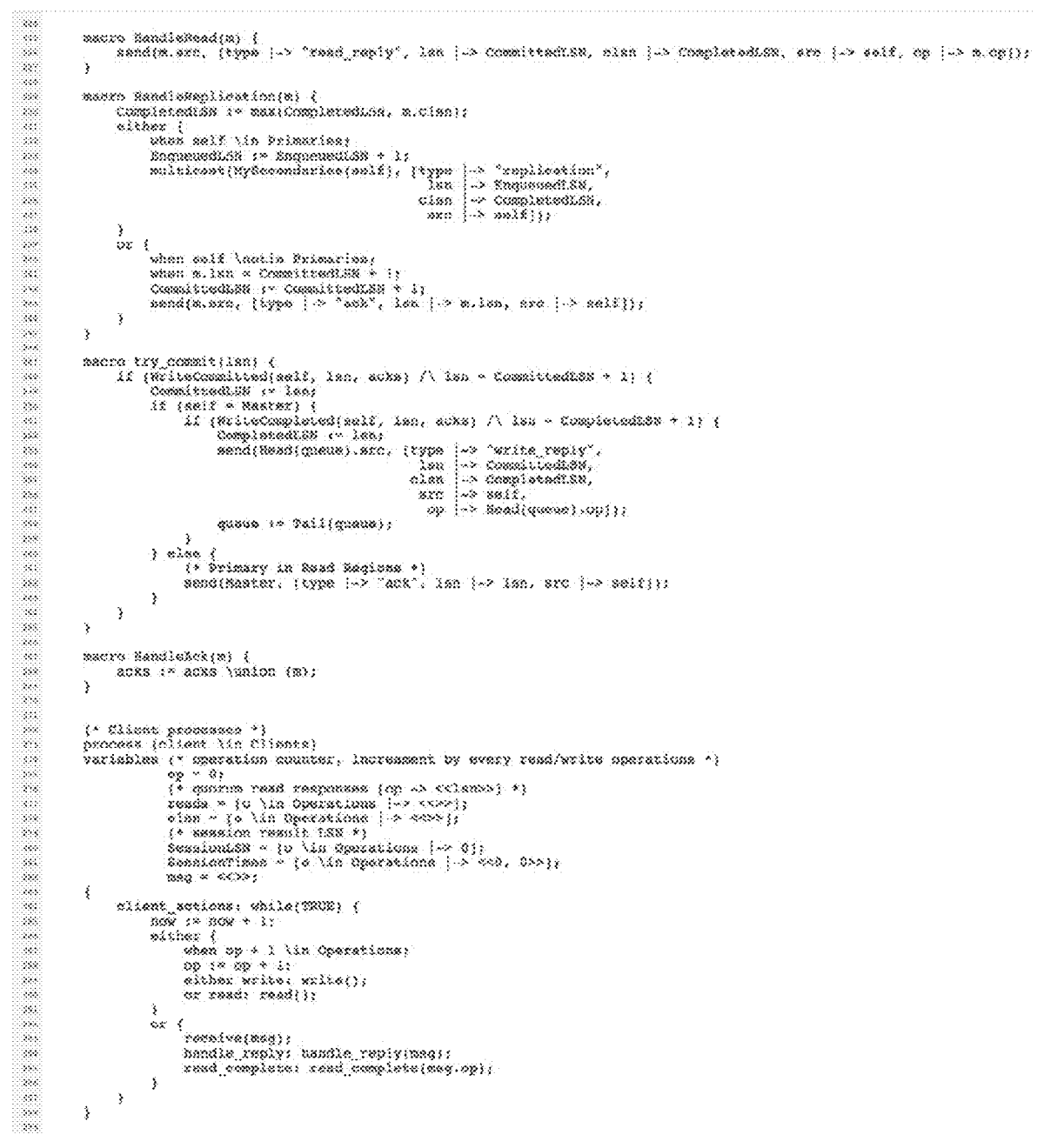

FIGS. 14A-K are a TLA+ specification of a consistency level set that may embody some aspects of the techniques presented herein.

DETAILED DESCRIPTION

Figure 1:
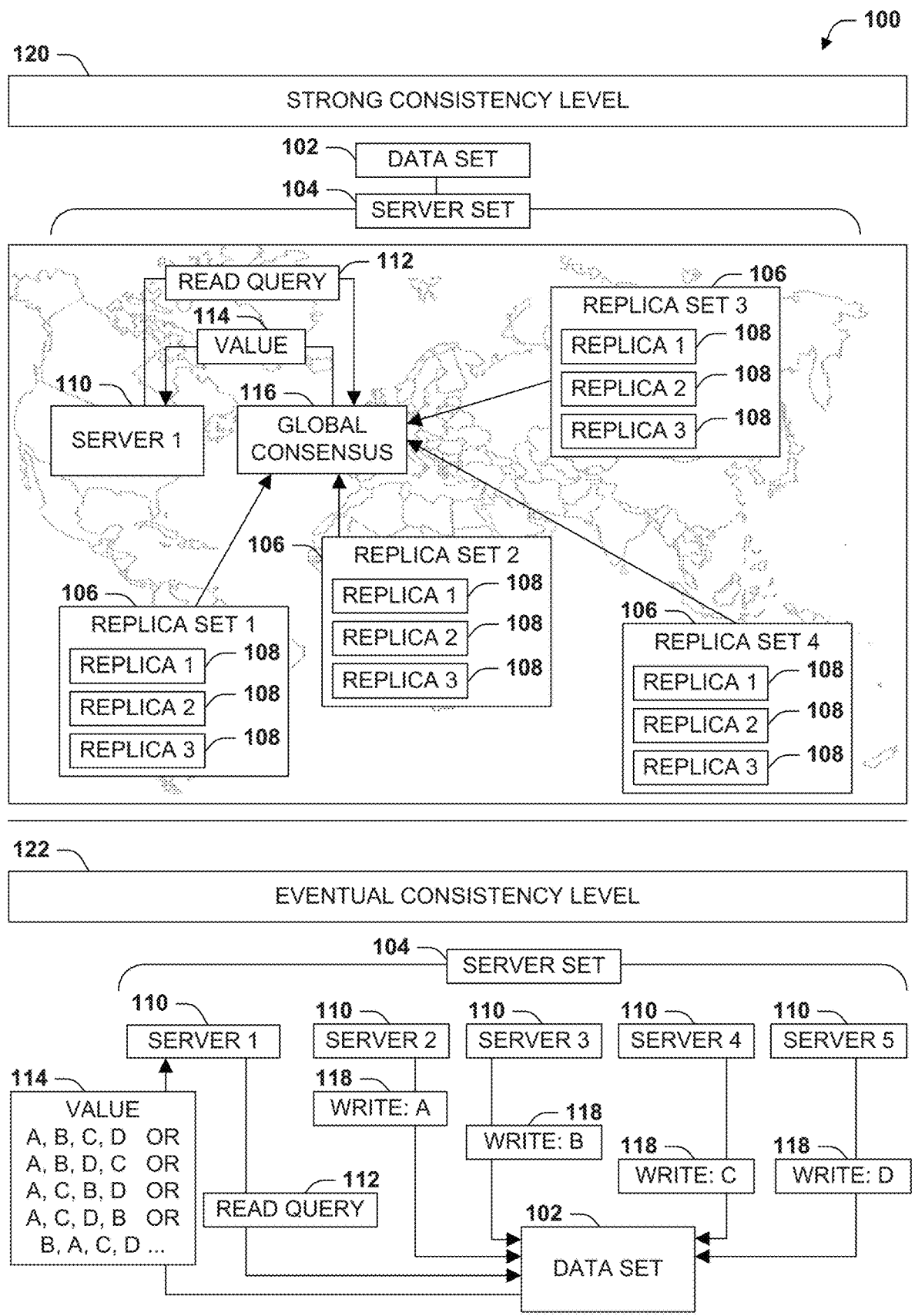
FIG. 1 is an illustration of a pair of example scenarios in which a server set provides a data set according to a consistency model.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

FIG. 1 is an illustration of an example scenario 100 featuring a data service that provides two consistency levels: a strong consistency level 120 and an eventual consistency level 122. A user of the service may choose between these options for consistency levels, e.g., to service different workloads that are bound by different consistency guarantees.

A first workload may utilize a strong consistency level 120, in which all writes of values 114 to a data set 102 may be diligently reconciled such that consistency is maintained across all replicas 108 and replica sets 106 over the entire world. For example, when a write is of a value 114 is received, servers 110 in different regions of the world may engage in a global consensus 116 to verify that the same value 114 appear everywhere before the write is committed. A read query 112 provided to any server 110 throughout the world is therefore guaranteed to return the same value 114 at all times.

While a strong consistency level 120 may be warranted in selected circumstances, it may be appreciated that achieving a global consensus 116 for every write of a value 114 to the data set 102 may impose a very significant computational cost on the server set 104. Each write may take a very long time to complete, and in some cases, writes may frequently fail if the global consensus 116 cannot be achieved. Applications and workload that are sensitive to latency may find the delay involved in completing the global consensus 116 to be burdensome or even irreconcilable with other considerations and performance requirements of the application. Moreover, the dependency upon global consensus 116 may significantly limit the scalability of the data set 102 and/or the server set 104; e.g., it may be problematic to expand the data volume of the data set 102, the demand for the data set 102, and/or the number of servers in the server set 104, as such expansions may disproportionately scale up the computational expense and delay of global consensus 116.

A second workload may utilize an eventual consistency level 122, in which a data set 102 is subjected to a series of writes 118 by different servers 110 that may be reconciled into a consistent data set with relaxed, and potentially unbounded, timing. As such, the sequence of writes 118 at any time point may fluctuate considerably, e.g., as writes 118 that occurred earlier but were aggregated later are retrospectively inserted into the sequence of values 114 exhibited by the data set 102. Such relaxed reconciliation may promote the rapid commitment of writes 118 to the data set 102 (e.g., since no consensus or even loose coordination is presented as a precondition to any server 110 committing a write 118 of the value 114), and may therefore promote very low-latency writes. However, server sets 104 that exhibit such haphazard and fluctuating values 114 as provided by this eventual consistency level 122 may be suitable only for a small number of applications with high tolerance of volatile and undependable sequences of values 114.

It may be appreciated that many workloads may require more consistency than an eventual consistency level 122, but less consistency than the strong consistency level 120 and the high latency and scalability limitations that arise therefrom. However, some data services only offer these consistency levels. Moreover, some data services may fail to define the consistency levels in a dependable way, e.g., through a TLA+ specification that specifically and rigorously defines the manner in which consistency is applied throughout the data set.

B. Presented Techniques

Figure 2:
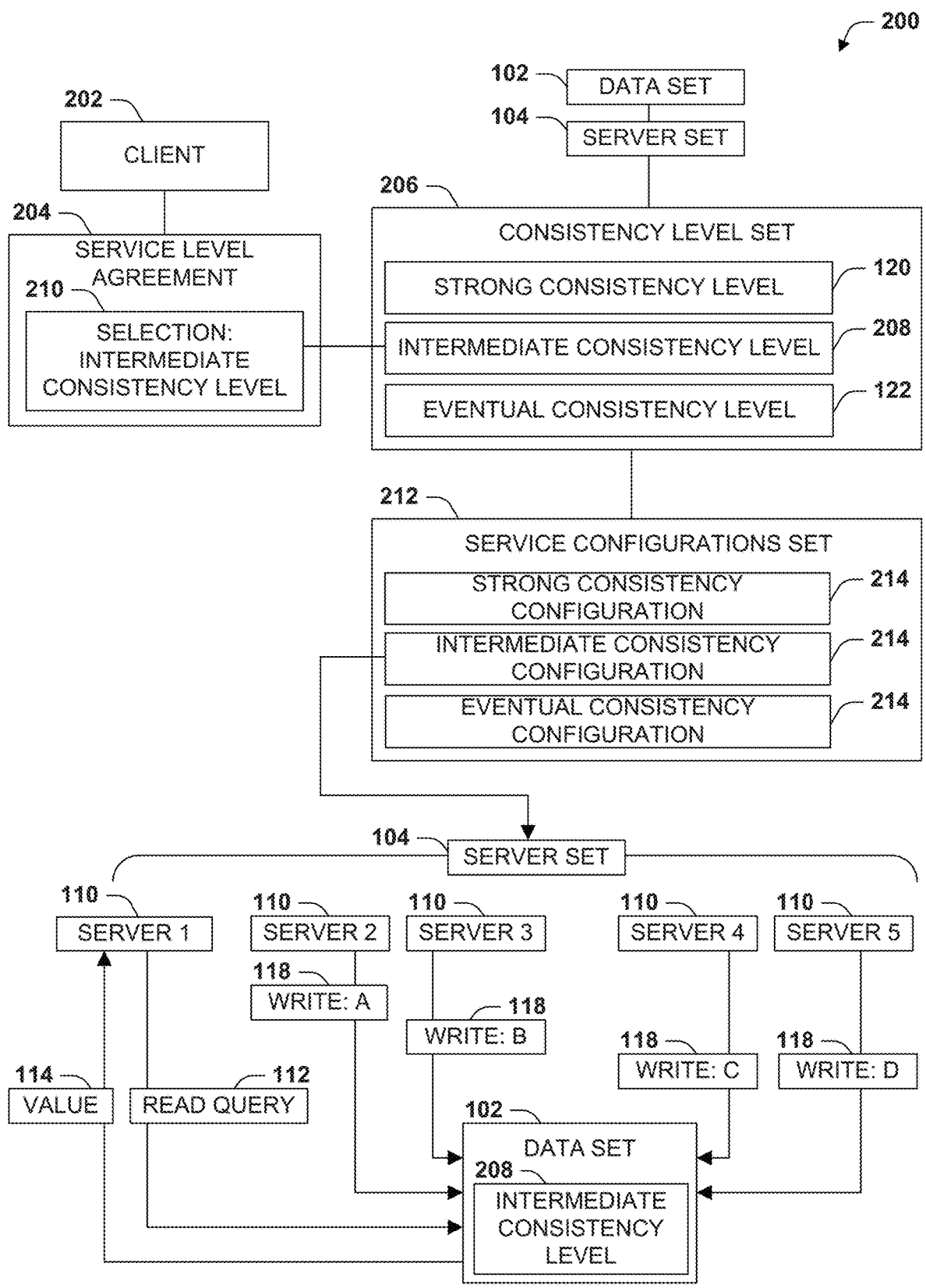
FIG. 2 is an illustration of a pair of example scenarios in which a server set provides a data set according to an intermediate consistency model in accordance with the techniques presented herein.

FIG. 2 is an illustration of an example scenario 200 featuring a server set 104 that is configured in accordance with the techniques presented herein. In this example scenario 200, a client 202 that seeks to utilize a server set 104 to process a data set 102 for an application may choose from among a consistency level set 206. Notably, this consistency level set 206 comprises a strong consistency level 120, such as shown in the example scenario 100 of FIG. 1; an eventual consistency level 122, such as also shown in the example scenario 100 of FIG. 1; and at least one intermediate consistency level 208 that is less rigid than the strong consistency level 120 but more rigid than the eventual consistency level 122. A selected intermediate consistency level 210 may be formalized between eh client 202 and the server 104 in a service level agreement 204. Moreover, the server set 104 may comprise a set of service configurations set 212, comprising different server configurations that may be applied to the server set 104 in response to various selections by the client 202 of different consistency levels of the consistency level set 206. For example, when the 202 selects the intermediate consistency level 208, an intermediate consistency configuration 214 may be selected and applied to the sever set 104 to cause writes 118 to the data set 102 by various servers 110 of the server set 104 to exhibit the intermediate consistency level 208. In this manner, the client 202 may be presented with a range of consistency level options that may be variously suitable for different applications, including a strong consistency level 120, an eventual consistency level 122, and at least one intermediate consistency level 208, in accordance with the techniques presented herein.

C. Examples

Figure 3:
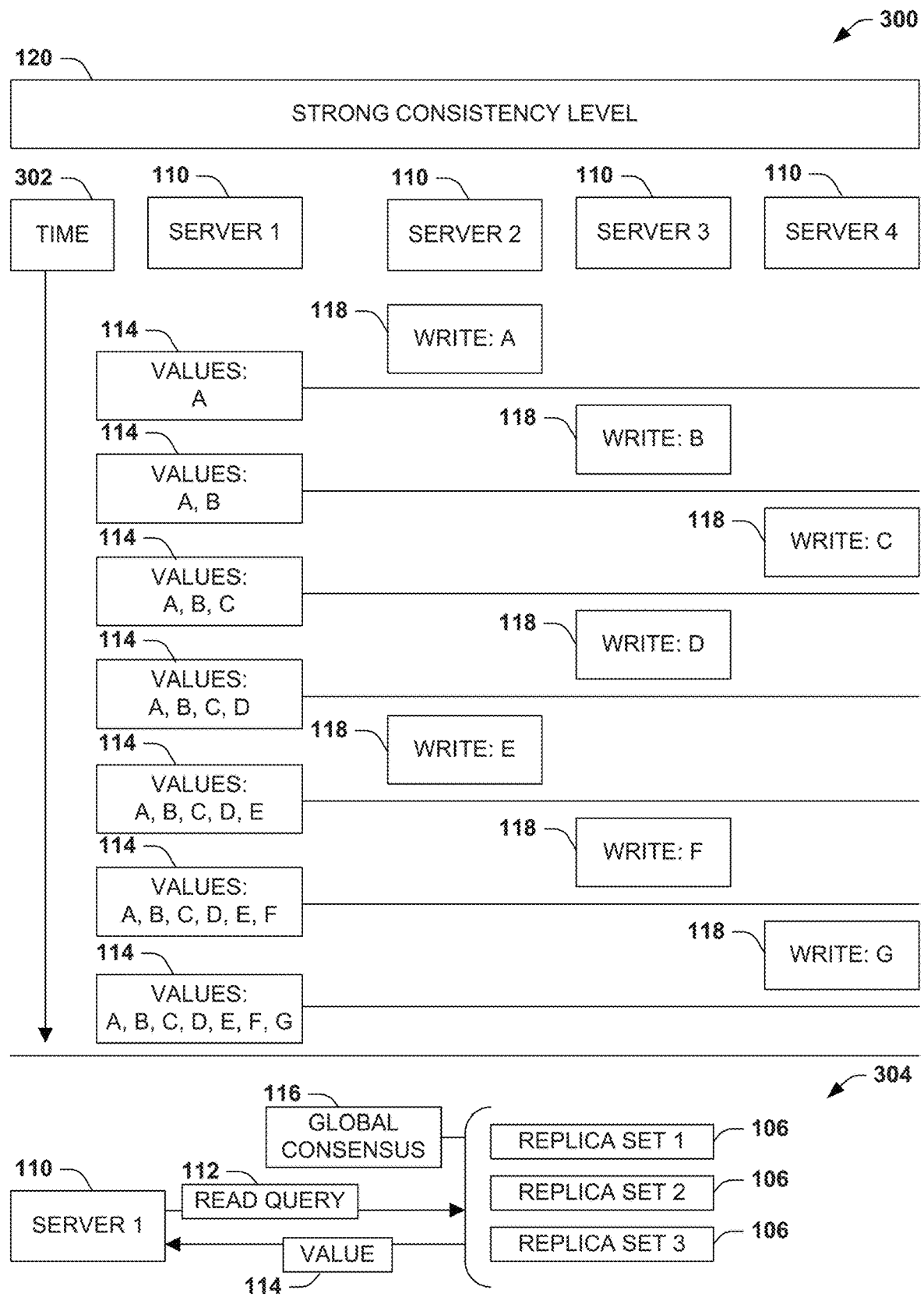
FIG. 3 is an illustration of a pair of example scenarios in which a server set provides a data set according to a strong consistency model in accordance with the techniques presented herein.

FIG. 3 is an illustration of an example scenario 300 featuring a strong consistency level that may be included in some variations of the techniques presented herein, as well as an example server configuration that may promote the implementation of a strong consistency level. As generally shown in the example scenario 300 of FIG. 3, the writes 118 provided by various servers become apparent in strict accordance with the sequential time of the writes 118 at all times. In this example scenario 300, respective server 110 initiate writes 118 to a value 114 at a particular time 302, e.g., a "wall clock" time that is synchronized among the servers 110. At all times 114, each server 110 observes the sequence of values 114 written by the servers 110 is strictly concurrent and at all times consistent with the time 302 of the respective writes 118; i.e., each server 110 observes the same sequential order of writes 118 to the values 114. One technique for achieving such strong consistency is to perform a global consensus 116 over the writes 118 by all replica sets 106, such that every read query 112 by any server 110 necessarily produces the most recent value 114, as well as the sequence of values 114 reflecting the times 302 of the writes 118. One such example of a strong consistency level in accordance with this example scenario 300 is provided in the TLA+ specification in FIGS. 14A-K. While this type of strong consistency level 120 may be desirable for highly concurrency-sensitive matters, such as financial transactions, the computational cost and/or high latency that arise from the global consensus 116 may be undesirable for and/or incompatible with many services.

Figure 4:
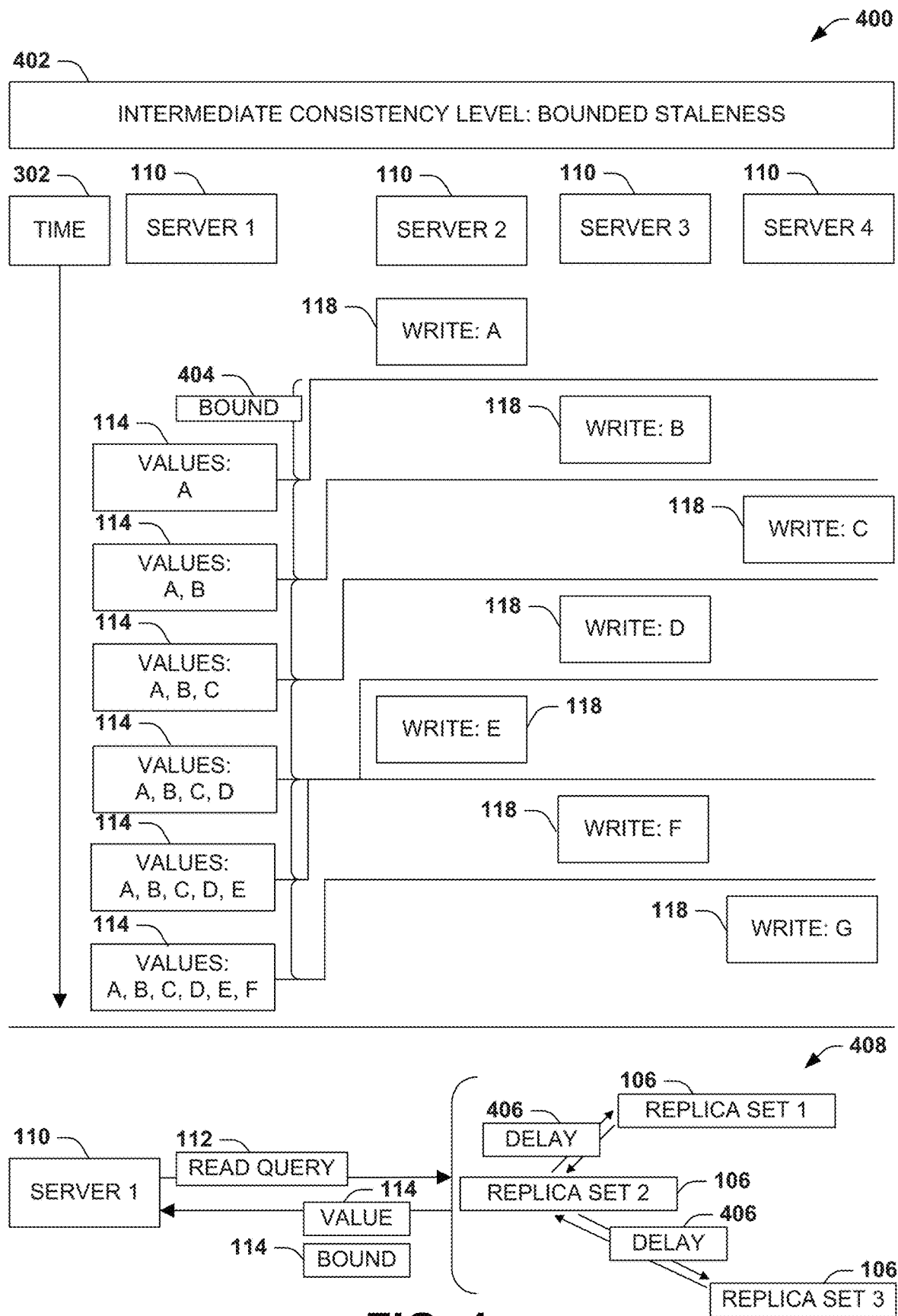
FIG. 4 is an illustration of a pair of example scenarios in which a server set provides a data set according to a bounded staleness consistency model in accordance with the techniques presented herein.

FIG. 4 is an illustration of an example scenario 400 featuring a bounded staleness intermediate consistency level that may be included in some variations of the techniques presented herein, as well as an example server configuration that may promote the implementation of a bounded staleness intermediate consistency level. As generally shown in the example scenario 400 of FIG. 4, the writes 118 by various servers 110 are guaranteed to become sequentially consistent with the other writes 118 after a maximum staleness bound. In this example scenario 400, the writes 118 of a value 114 by the respective servers 110 occur at various times 302, and are guaranteed to be propagated over the entire server set within a staleness bound 404, such as a maximum duration within which a write 118 is pending before it is guaranteed to be committed to and visible to all servers 110 of the server set. One such technique for achieving a bounded staleness involves measuring the delay 406 between replica sets 106 in committing writes 118 (e.g., the maximum network transport and processing duration among all replicas of the server set), such that the maximum end-to-end delay in propagating any write 118 across all servers 110 of the server set is determined as the staleness bound 404. The servers 110 may therefore be configured to operate upon the basis that the sequence of values 114 that are visible to any server 110 are guaranteed to be current and consistent across the entire server set 110 up to a certain duration before the current time, as determined by the staleness bound 404. For example, if the staleness bound is 10 milliseconds, then every server 110 may operate upon the data of the data set with a guarantee that any writes 118 to a value 114 are guaranteed to be current as of, at the earliest, 10 milliseconds before the current time. If a server has to be configured to ensure that a value 114 is current and durable within the sequence of values 114 (according to the sequence of writes 118 by the various servers 110) as of a particular time, it may simply wait for at least the staleness bound 404 (e.g., wait 10 milliseconds) and then presume that no subsequently received writes 118 will occur that retroactively alter the value 114 before the target time. One such example of a bounded staleness intermediate consistency level in accordance with this example scenario 400 is provided in the TLA+ specification in FIGS. 14A-K.

Figure 5:
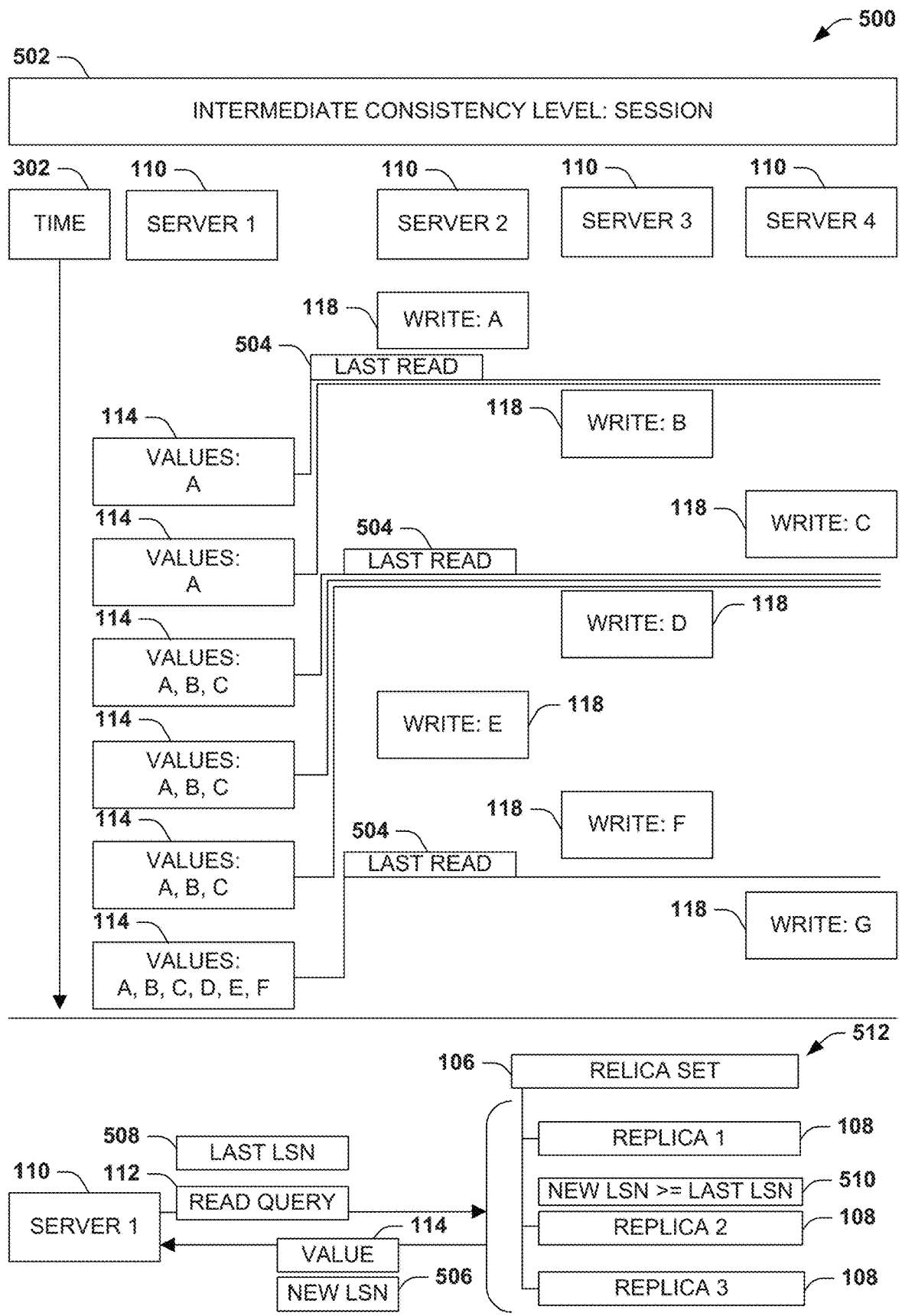
FIG. 5 is an illustration of a pair of example scenarios in which a server set provides a data set according to a session consistency model in accordance with the techniques presented herein.

FIG. 5 is an illustration of an example scenario 500 featuring a session intermediate consistency level that may be included in some variations of the techniques presented herein, as well as an example server configuration that may promote the implementation of a session intermediate consistency level. As generally shown in the example scenario 500 of FIG. 5, a particular session is guaranteed to observe a sequentially consistent series of writes, even if some writes require an unexpectedly long staleness bound, and even if the sequential series of writes that is apparent to a first session may differ from a second session. In this example scenario 500, respective servers 110 may present the sequence of values 114 arising from various writes 118 in the manner of a session, wherein the sequence of values 114 within a particular session is guaranteed to be logically consistent, even if the sequence of values perceived by a first session does not necessarily match the sequence of values perceived by a second session. Such techniques may occur, e.g., by choosing sessions according to the time of last read 504 for the session, such that all writes 118 to a particular value 114 that are received prior to the last read 504 are inserted into the session. The server 110 may anticipate that newer writes 118 to the values 114 may have been written subsequent to the last read 504 and may not yet have been received, and/or that the sequence of values 114 within its first session does not exactly match the sequence of values 114 within a second session; however, within each session, the sequence of values 114 is guaranteed to be logically consistent. Session consistency may be achieved, e.g., by associating logical sequence numbers 506 with respective writes 114, and sorting together the values 114 according to the logical sequence numbers 506, such that writes 118 to the value 114 that are received after a last logical sequence number 508 that is associated with the last read 504 are sorted in a manner that follows all of the writes as of the last read 504. While the logical sequence numbers may cause writes within an update to vary between sessions (e.g., two concurrent writes 118 may appear in a first order on a first server 110 and in a reverse order on a second server 110), but the logical sequence within each session, relative to the preceding values in the previous last read 504 as well as the subsequent values that follow the current read, are guaranteed to remain consistent within the session. One such example of a session intermediate consistency level in accordance with this example scenario 500 is provided in the TLA+ specification in FIGS. 14A-K.

Figure 6:
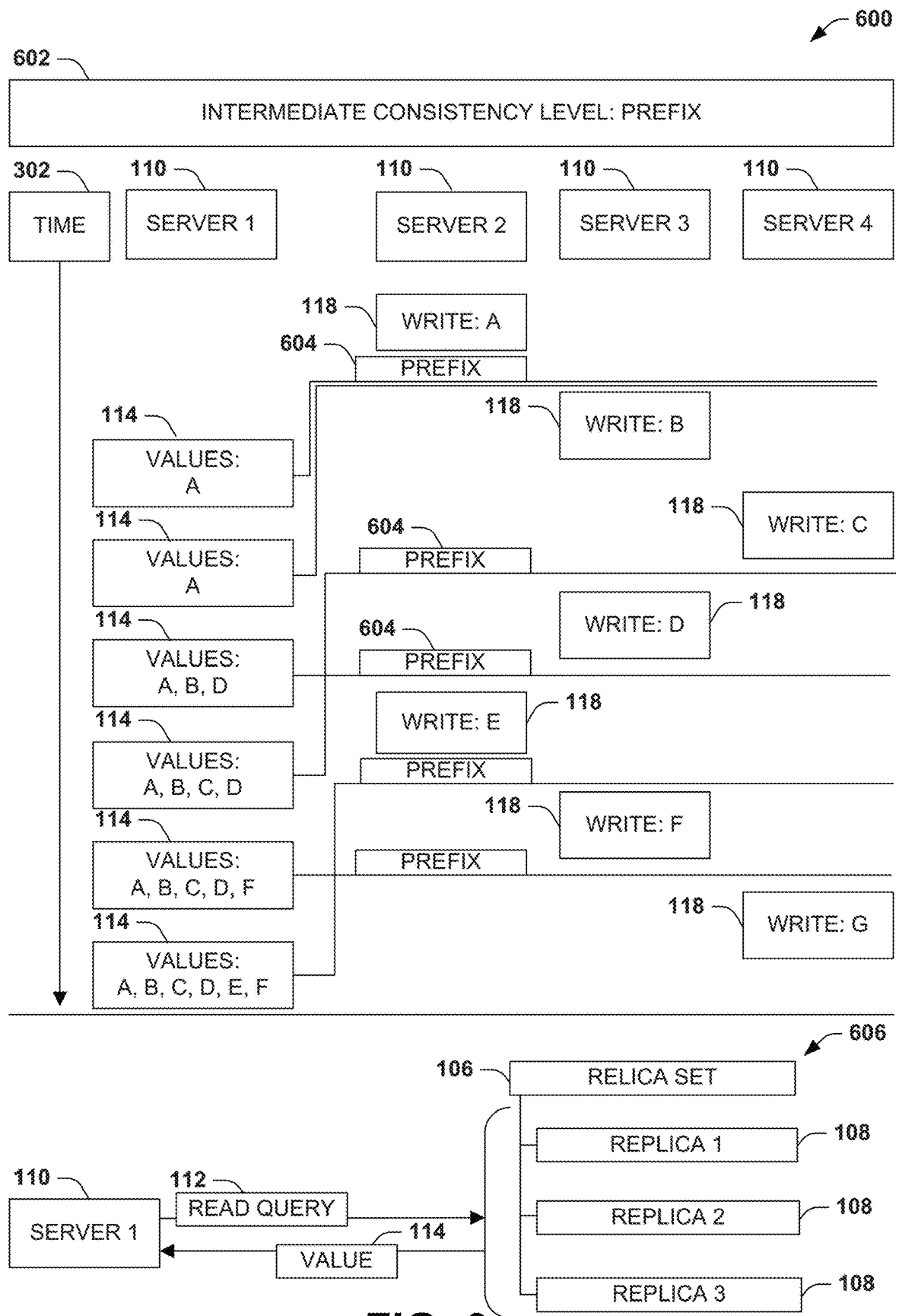
FIG. 6 is an illustration of a pair of example scenarios in which a server set provides a data set according to a prefix consistency model in accordance with the techniques presented herein.

FIG. 6 is an illustration of an example scenario 600 featuring a prefix intermediate consistency level that may be included in some variations of the techniques presented herein, as well as an example server configuration that may promote the implementation of a prefix intermediate consistency level. As generally shown in the example scenario 600 of FIG. 6, a sequentially consistent series of writes is guaranteed to be correct up to a particular bound or "prefix" that does not regress, although the prefix may change in an irregular and/or unpredictable duration. In this example scenario 600, each server 110 issues a read request and is provided all values 114 for writes 118 occurring up to a prefix 604. The gap between a current time 302 and the prefix 604 may change (e.g., a fairly brief window during a first read that produces all recent writes 118, and a fairly extensive window during second read that leaves a sizable gap between reported writes and occurring writes at the time of the read). Indeed, in some circumstances, two successive reads may result in the same prefix 604, such that the second read produces no new writes 118 to the value 114 even if such writes 118 have subsequently occurred. However, the prefix 604 provides a guarantee that all writes 118 occurring prior to the prefix 604 are fixed and will not change; i.e., the prefix 604 acts as a checkpoint, such that the server 110 is guaranteed that all writes prior to the prefix 604 are fixed and current as of the time of the prefix 604. The prefix 604 may monotonically increase, though at a different and potentially unpredictable rate, and the sequence of writes 118 may vary within a session on the same server 110 (e.g., if the server 110 receives writes within a session that are after a prefix 604, and a subsequent read moves the prefix 604 forward but presents additional writes that change the order of the observed values on the server 110), such that the consistency within the session changes. Nevertheless, each server is guaranteed that writes 118 prior to the prefix 604 are durable and will not be altered. One such example of a prefix intermediate consistency level in accordance with this example scenario 600 is provided in the TLA+ specification in FIGS. 14A-K.

Figure 7:
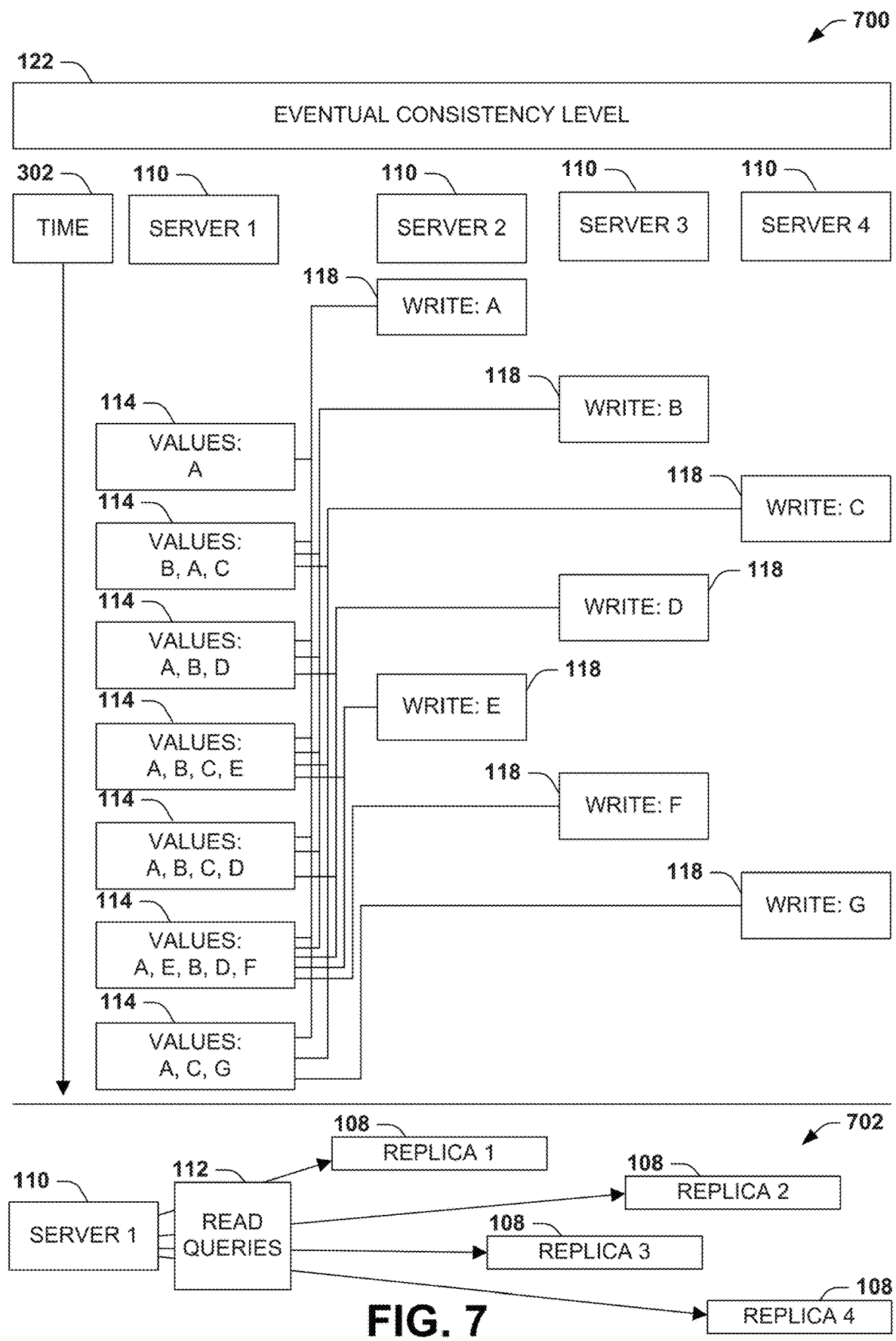
FIG. 7 is an illustration of a pair of example scenarios in which a server set provides a data set according to an eventual consistency model in accordance with the techniques presented herein.

FIG. 7 is an illustration of an example scenario 700 featuring an eventual consistency level that may be included in some variations of the techniques presented herein, as well as an example server configuration that may promote the implementation of an eventual consistency level. As generally shown in the example scenario 700 of FIG. 7, all writes are guarantees to be made sequentially consistent at some future point, although the time point may differ for different writes and may therefore reflect a fluctuating, and in some cases retrospectively differing, write sequence. In this example scenario 700, writes may arrive at a particular server 110 in no guaranteed order and with no predictable period of propagation across the entire server set 110. As such, the order of writes 118 may appear to fluctuate significantly 114, wherein a first, earlier-received write 118 of a value 114 may be retroactively invalidated by a second, later-received but earlier-initiated write 118 of the value that presented a long propagation delay. In this scenario 700, each server 110 is guaranteed to observe each write 118 eventually, but with no particular guarantee as to received order or sequential consistency. One such example of the eventual consistency level in accordance with this example scenario 700 is provided in the TLA+ specification in FIGS. 14A-K.

Figure 8:
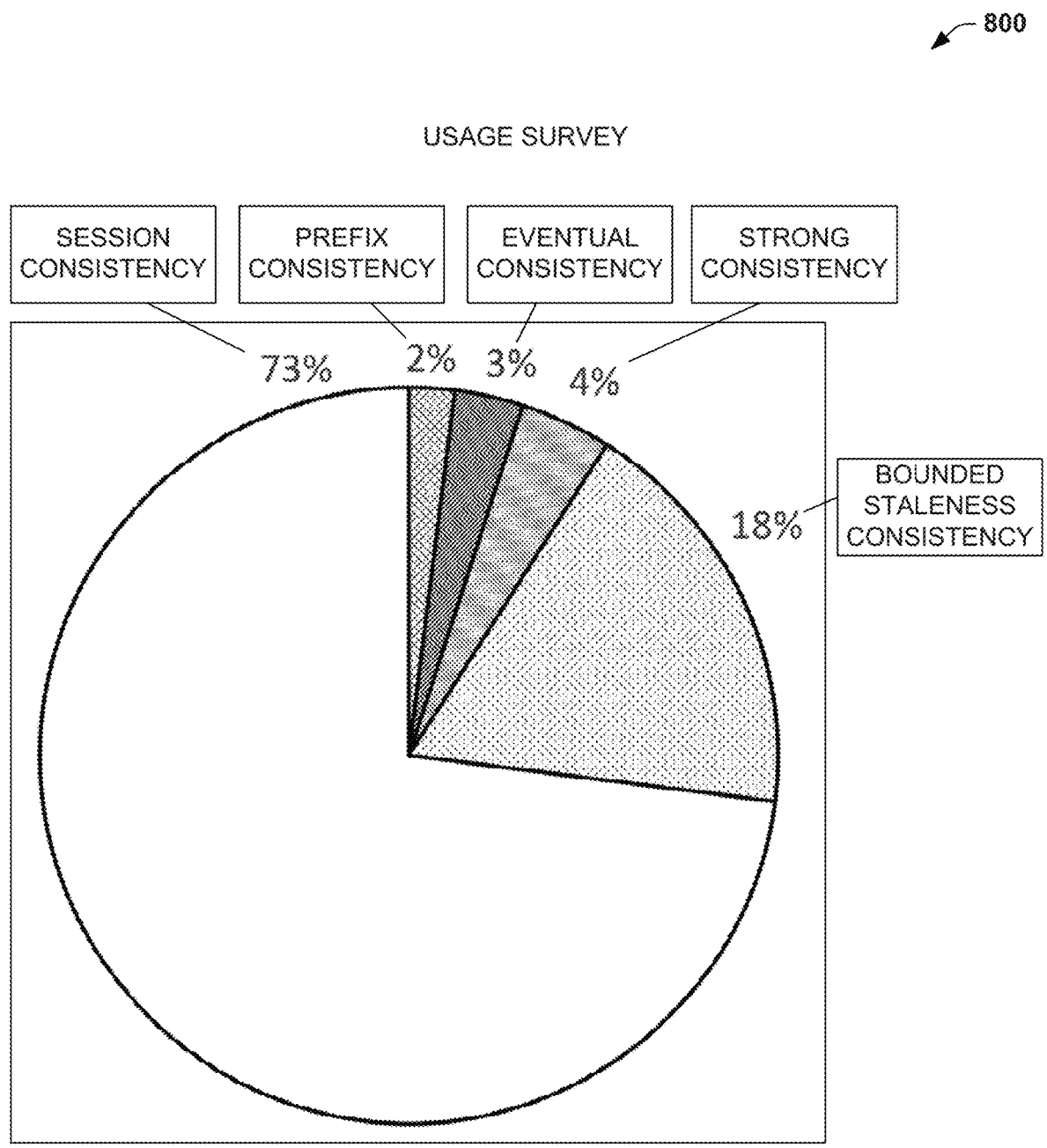
FIG. 8 is an illustration of a result of a usage survey of a data service that provides a range of consistency levels in accordance with the techniques presented herein.

FIG. 8 is an illustration of a result of a usage survey of a data service that provides a range of consistency levels in accordance with the techniques presented herein. A broad set of users was provided a choice of five consistency levels—strong consistency, bounded staleness consistency, session consistency, prefix consistency, and eventual consistency—to service their applications in a large-scale distributed database. Perhaps contrary to expectations, very few users were found to choose and/or prefer either a strong consistency model or an eventual consistency model (4% and 3%, respectively). A sizable majority of the population (73%) chose a session consistency model as an adequate intermediate consistency level for their applications. A second significant portion of the population (18%) chose a bounded staleness consistency level for their applications.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., a server and/or system, such as the examples presented in the example scenario 900 of FIG. 9; a method of providing a service with one or more intermediate consistency levels, such as the example methods presented FIGS. 10-11; and a computer-readable storage device, such as the example computer-readable storage device presented in FIG. 13) to confer individual and/or synergistic advantages upon such embodiments.

As a first variation, the presented techniques may be utilized with a variety of servers, such as workstations, laptops, consoles, tablets, phones, portable media and/or game players, embedded systems, appliances, vehicles, and wearable devices. The server may also comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). Additionally, such data sets may be accessed by a variety of clients, such as a client process on a server storing the data set; other servers within the server set; and/or various client devices that utilize the server set on behalf of one or more users and/or other devices.

As a second variation, the presented techniques may be utilized with a variety of data sets featuring a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such data sets may also be used in a variety of circumstances, such as data warehousing; content provided through a content system such as a webserver; and object systems for an application or operating system. Some data sets may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data). Many such scenarios may be identified in which the techniques presented herein may be advantageously utilized.

As a third variation, a value may be written to the data set by a set of replicas. The consistency level set may further comprise a strong consistency level that provides, for a read query, the value that was last written among all of replica of the data set. As one such example, the consistency level set may specify a strong consistency level on condition of the value being written among a replica set of replicas that are collectively located within a threshold distance.

As a fourth variation, the intermediate consistency level may further comprise a bounded staleness consistency level that provides, for a read query applied over the server set, a value written to the data set that is within a staleness threshold. In one such variation, selecting the server configuration for the bounded staleness consistency level further comprise measuring a round-trip duration between the server and a replica of the data set from which the value is read, and setting the staleness threshold according to the round-trip duration. In one such embodiment, selecting the server configuration for the bounded staleness consistency level may involve receiving a selection of a custom staleness threshold for the bounded staleness consistency level, and applying the custom staleness threshold only on condition of the staleness threshold exceeding the round-trip duration. In another such embodiment, a value may be written to the data set by a replica set of replicas, wherein the respective replicas acknowledge the write within an acknowledgment duration, and selecting the server configuration for the bounded staleness consistency level may involve setting the staleness threshold according to the acknowledgment duration of the replica set.

As a fifth variation, a data set may be presented as a session that last presented the data set up to a log sequence number. The intermediate consistency level further comprises a session consistency level that provides, for a read query applied over the data set, a value that is more recent than the log sequence number. As one such example, the session may request the read query while encoding the log sequence number for which the data set was last presented; and the selection of the server configuration for the session consistency level may involve configuring the server to encode the log sequence number with the read request. As another such example, selecting the server configuration of the server may involve storing a set of write queries that were requested through the session and applied to the data set sorting the write queries together with the value for presentation during the session.

As a sixth variation, a value may be written to the data set in a sequential order. The intermediate consistency level further comprises a prefix consistency level that provides, for a read query applied over the data set, a value that is latest in the sequential order according to a selected time. For example, the server set further comprises at least two replica sets of replicas within which the value is written, wherein the sequential order within the respective replica sets is monotonic, and the selection of the server configuration for the prefix consistency level may further comprise configuring the server to read consistently from a selected replica set of the server set.

As a seventh variation, a value may be written to the data set across a set of replicas. The consistency level set may further comprise a strong consistency level that provides, for a read query applied over the data set, the value read from any of the replicas.

As an eighth variation, an embodiment may measure a performance characteristic of the data set that relates to the intermediate consistency level during provision of the data set by the server, and compare the performance characteristic with the intermediate consistency level selected by the service level agreement to verify that the server fulfills the intermediate consistency level. Responsive to determining that the server fails to fulfill the intermediate consistency level, the embodiment may identify a deficiency of the intermediate consistency level exhibited by the server. As one such example, the embodiment may select a revised consistency level and reconfigure the server according to the revised consistency level. In an embodiment, the reconfiguration may be performed according to the revised consistency level by choosing a lower consistency level of the consistency level set that is consistent with the performance characteristic. Alternatively or additionally, an embodiment may report the deficiency of the intermediate consistency level to an administrator of the service level agreement.

As a ninth variation, an embodiment may receive a read query to read a value of the data set, wherein the read query comprises an override request to override of the consistency level selected in the service level agreement for the read query. Responsive to the read query and the override request, the embodiment may apply the read query to the data set using a different consistency level than the consistency level selected in the service level agreement. Many such variations may be included in embodiment of the techniques presented herein.

E. Example Embodiments

Figure 9:
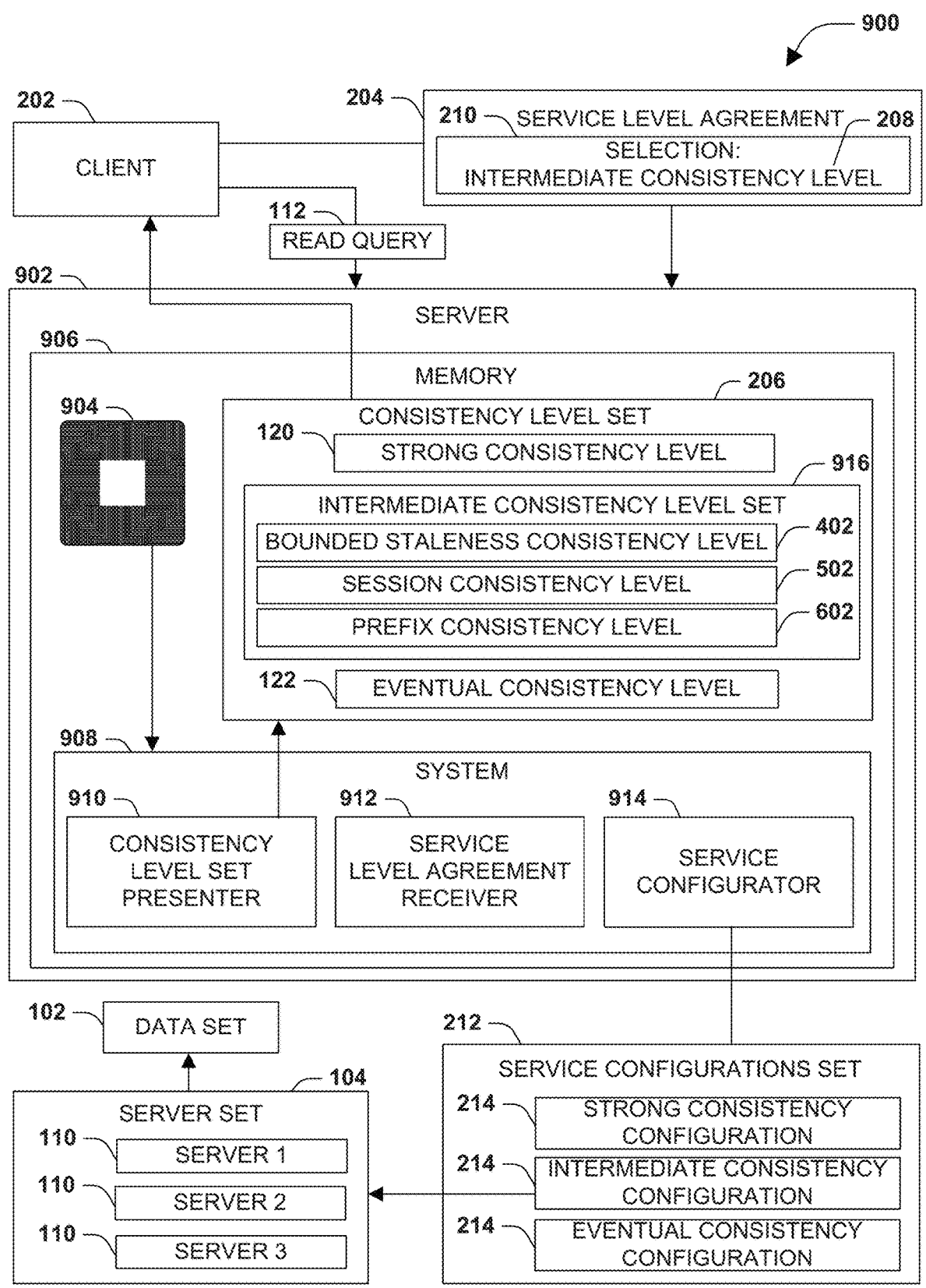
FIG. 9 is a component block diagram illustrating an example server featuring an example system for configuring a server set to provide a data set in accordance with the techniques presented herein.

FIG. 9 is an illustration of an example scenario 900 featuring some example embodiments of the techniques presented herein, including an example server 902 that participates in the provision of a data set 102 by a server set 104. The example server 902 comprises a processor 904 and a memory 906 (e.g., a memory circuit, a platter of a hard disk drive, a solid-state storage device, or a magnetic or optical disc) encoding instructions that, when executed by the processor 904 of the example server 902, cause the example server 902 to provide the data set 102 in accordance with the techniques presented herein. More particularly, in this example scenario 900, the instructions encode a set of components comprising an example system 908 usable on the example server 902, wherein the interoperation of the components causes the example server 902 to provide a data set as part of the server set 104 in accordance with the techniques presented herein.

The example system 908 comprises a consistency level set presenter 910 that defines a consistency level set 206 comprising a strong consistency level 120; an eventual consistency level 112; and at least one intermediate consistency level 208 that is less strict than the strong consistency level 120 and more strict than an eventual consistency level 122. In this particular example scenario 900, the consistency level set 206 further includes an intermediate consistency level set 916 defining multiple intermediate consistency levels, including a bounded staleness consistency level 402; a session consistency level 502; and a prefix consistency level 602. The example system 908 further comprises a service level agreement receiver 912 that receives a service level agreement 204 from a client 202 that includes a 210 selection of an intermediate consistency level 208 of the consistency level set 206. The example system 908 further comprises a service configurator 914 that selects and applies to the servers 110 of the server set 104 for the data set 102 a service configuration 214 that fulfills the selected intermediate consistency level 208. In this manner, the interoperation of the components of the example system 908 causes the example server 902 to fulfill the intermediate consistency level 208 according to the selection 210 of the service level agreement 204 in accordance with the techniques presented herein.

Figure 10:
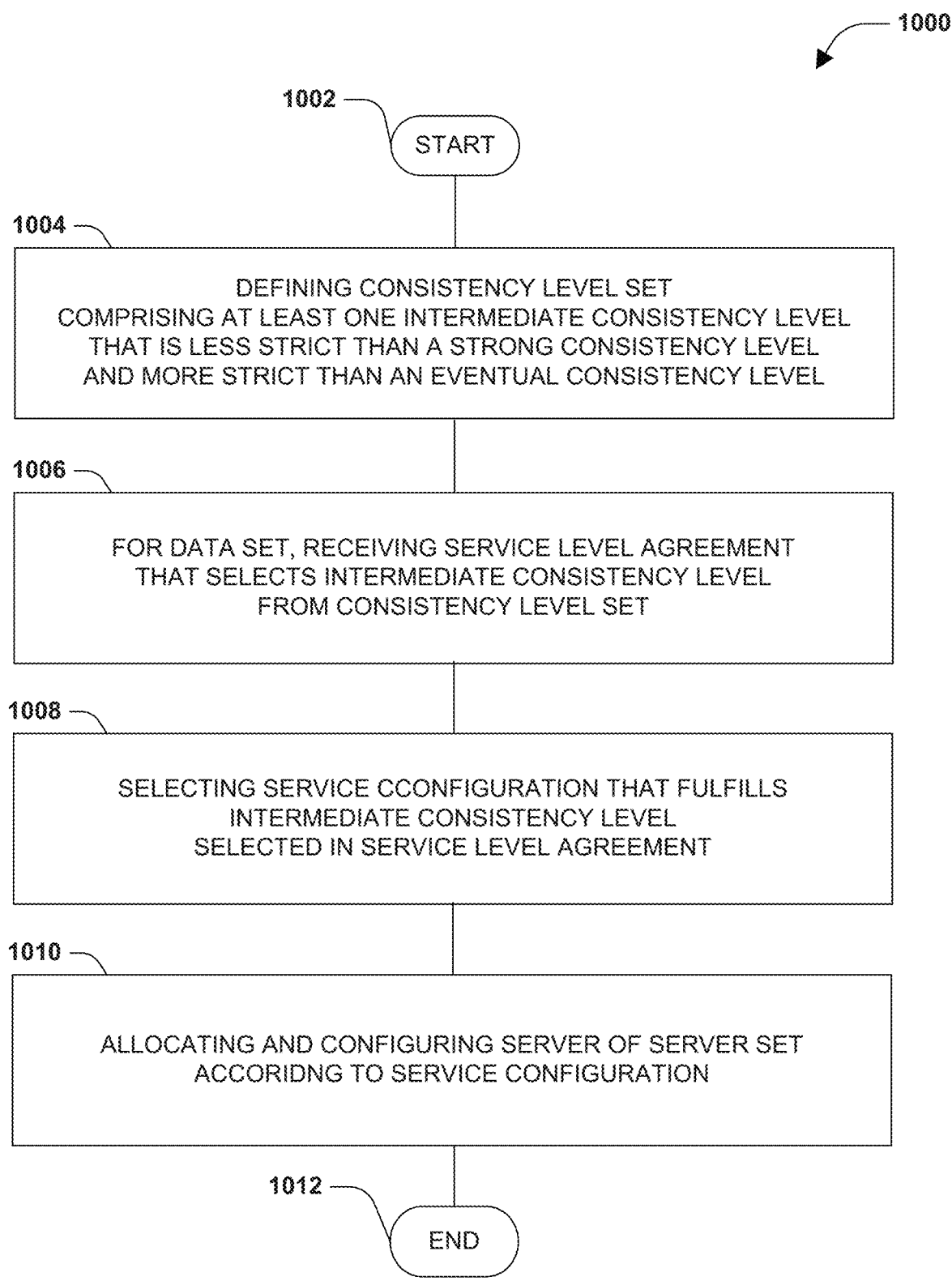
FIG. 10 is a flow diagram illustrating a first example method of configuring a server set to provide a data set in accordance with the techniques presented herein.

FIG. 10 is an illustration of an example scenario featuring a third example embodiment of the techniques presented herein, wherein the example embodiment comprises a first example method 1000 of configuring a server set to provide a data set 102 in accordance with techniques presented herein. The example method 1100 involves a server comprising a processor 904, and may be implemented, e.g., as a set of instructions stored in a memory 906 of the server, such as firmware, system memory, a hard disk drive, a solid-state storage component, or a magnetic or optical medium, wherein the execution of the instructions by the processor 904 causes the server to operate in accordance with the techniques presented herein.

The first example method 1000 begins at 1002 and involves defining 1004 a consistency level set 206 comprising at least one intermediate consistency level 208 that is less strict than a strong consistency level 120 and more strict than an eventual consistency level 122. The example method 1000 also involves, for the data set, receiving 1006 a service level agreement that selects the intermediate consistency level from the consistency level set. The example method 1000 also involves selecting 1008 a service configuration 214 that fulfills the intermediate consistency level 208 selected in the service level agreement 204. The example method 1000 also involves allocating and configuring 1010 a server 110 of the server set 104 according to the service configuration 214. In this manner, the first example method 1000 causes the example server 902 to provide the data set 102 in accordance with the techniques presented herein, and so ends at 1012.

Figure 11:
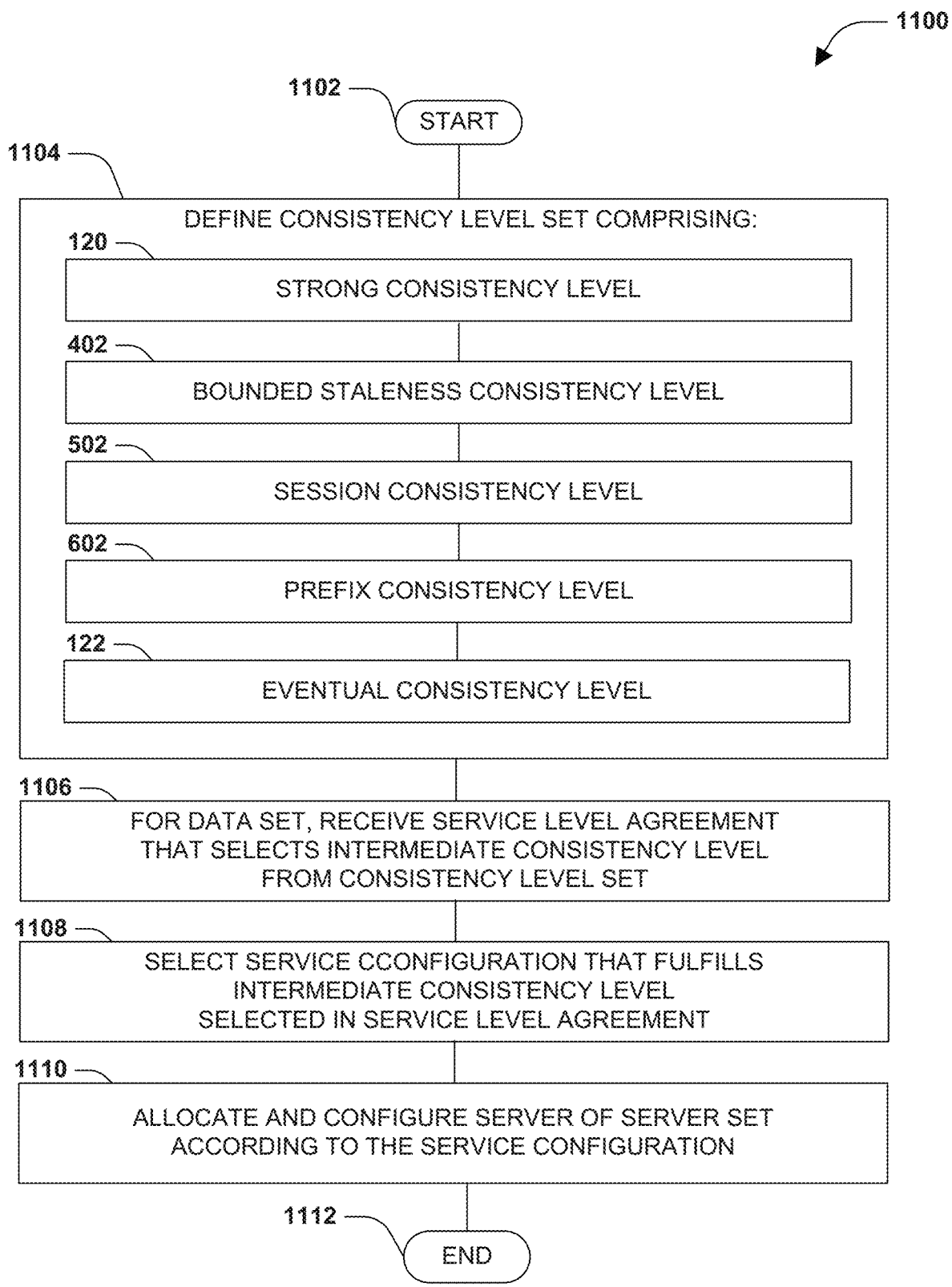
FIG. 11 is a flow diagram illustrating a second example method of configuring a server set to provide a data set in accordance with the techniques presented herein.

FIG. 11 is an illustration of an example scenario featuring a fourth example embodiment of the techniques presented herein, wherein the example embodiment comprises a second example method 1100 of configuring a server set to provide a data set 102 in accordance with techniques presented herein. The example method 1100 involves a server comprising a processor 904, and may be implemented, e.g., as a set of instructions stored in a memory 906 of the server, such as firmware, system memory, a hard disk drive, a solid-state storage component, or a magnetic or optical medium, wherein the execution of the instructions by the processor 904 causes the server to operate in accordance with the techniques presented herein.

The second example method 1100 begins at 1102 and involves defining 1104 a consistency level set 206 comprising a strong consistency level 120; an eventual consistency level 122; and an inconsistency level set 916 of intermediate consistency levels 208 that are less strict than the strong consistency level 120 and more strict than the eventual consistency level 122. The inconsistency level set 916 further comprises a bounded staleness consistency level 402; a session consistency level 502; and a prefix consistency level 602. The example method 1100 also involves, for the data set 102, receiving 1106 a service level agreement that selects the intermediate consistency level from the consistency level set. The example method 1100 also involves selecting 1108 a service configuration 214 that fulfills the intermediate consistency level 208 selected in the service level agreement 204. The example method 1100 also involves allocating and configuring 1110 a server 110 of the server set 104 according to the service configuration 214. In this manner, the second example method 1100 causes the example server 902 to provide the data set 102 in accordance with the techniques presented herein, and so ends at 1112.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 12:
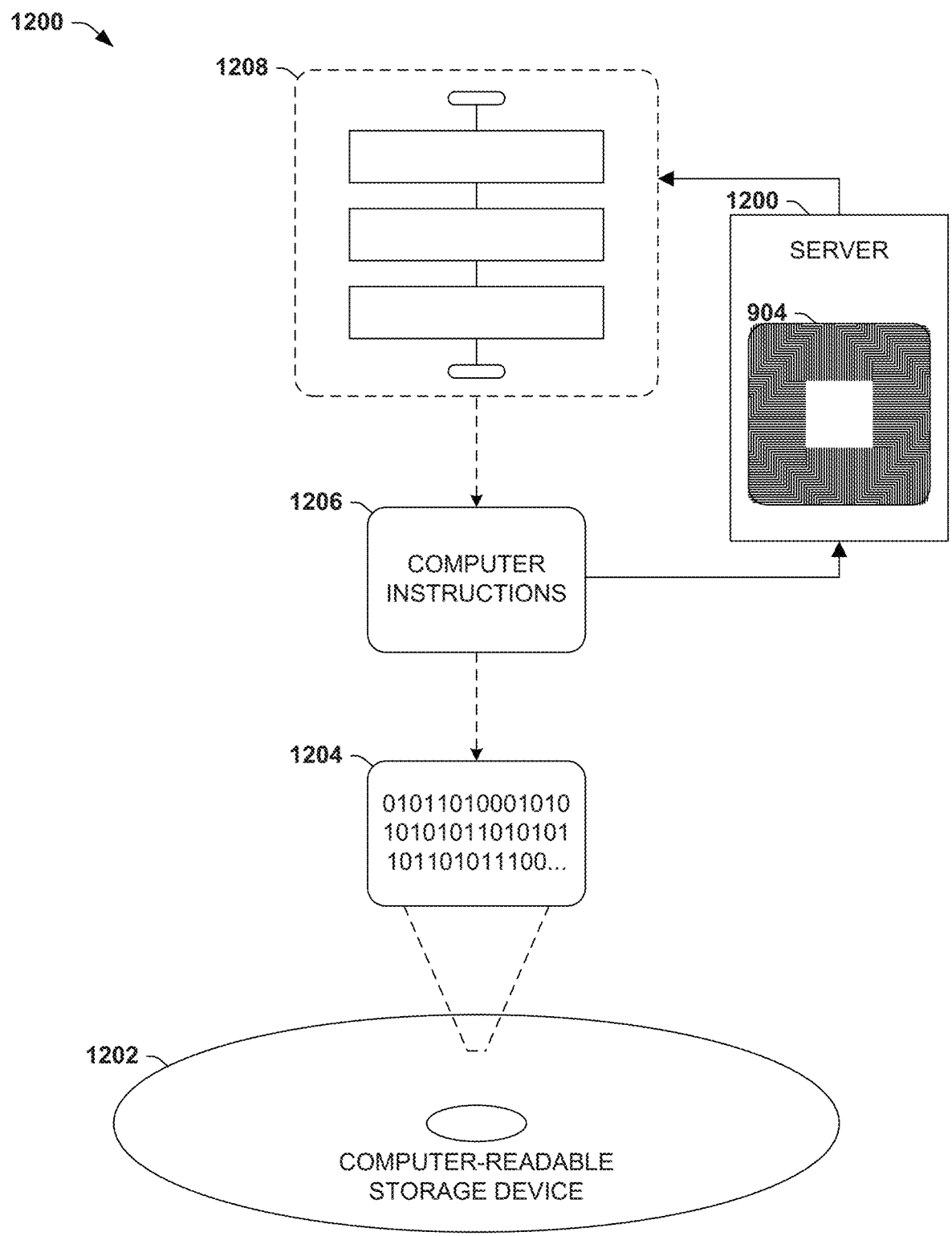
FIG. 12 is an illustration of an example computer-readable medium storing instructions that provide an embodiment of the techniques presented herein.

An example computer-readable medium that may be devised in these ways is illustrated in FIG. 12, wherein the implementation 1200 comprises a computer-readable memory device 1202 (e.g., a CD-R, DVD-R, or a platter of a hard disk drive), on which is encoded computer-readable data 1204. This computer-readable data 1204 in turn comprises a set of computer instructions 1206 that, when executed on a processor 904 of a server 902, cause the server to operate according to the principles set forth herein. For example, the processor-executable instructions 1206 may encode a system that provides a system with support for intermediate consistency levels, such as the example system 908 of FIG. 9. As another example, the processor-executable instructions 1206 may encode a method of configuring a server to provide a service with at least one intermediate consistency level, such as the first example method 1000 of FIG. 10 or the second example method 1100 of FIG. 11. Many such computer-readable media may be devised by those of ordinary skill in the art that are configured to operate in accordance with the techniques presented herein.

F. Computing Environment

Figure 13:
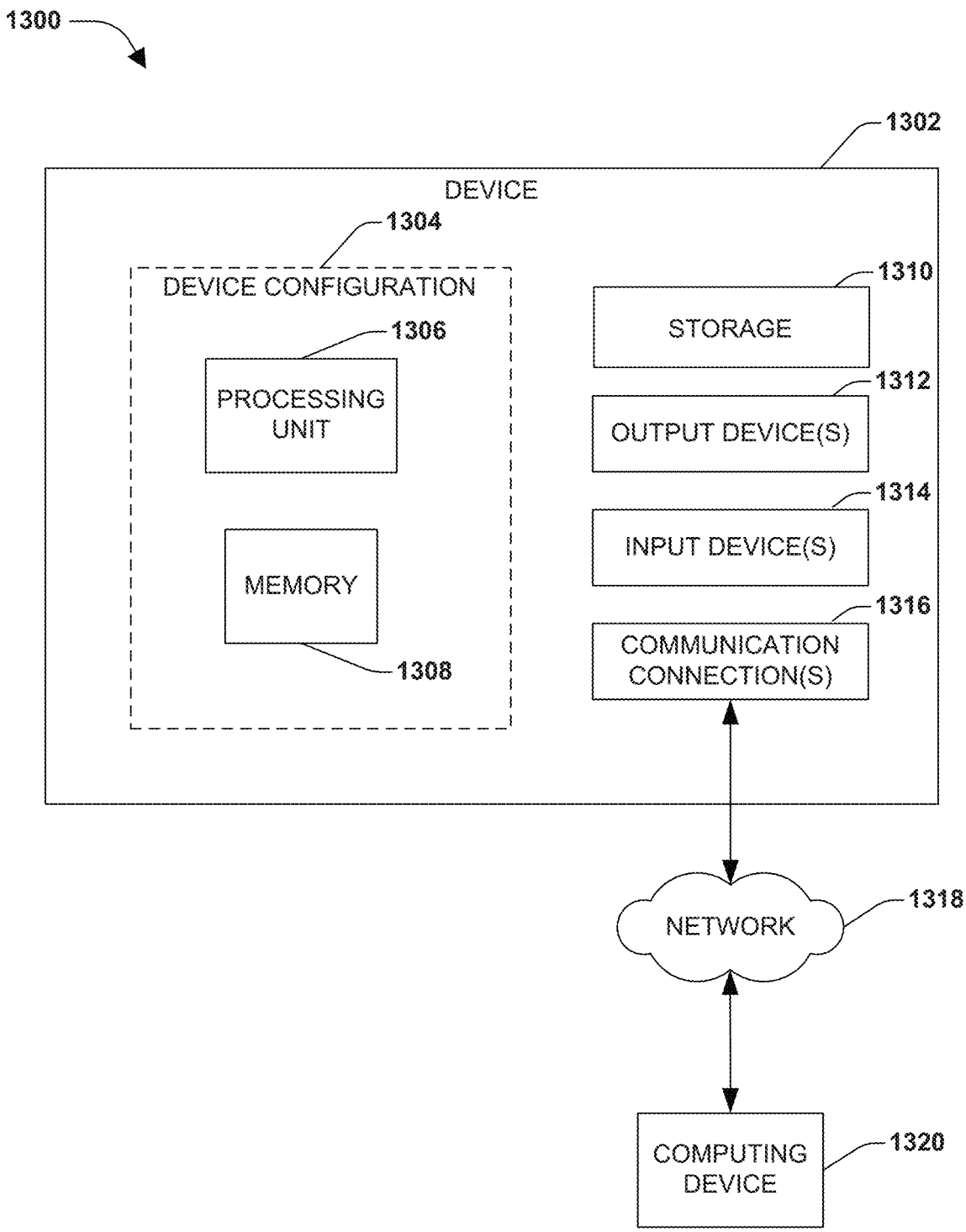
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system comprising a computing device 1302 configured to implement one or more embodiments provided herein. In one configuration, computing device 1302 includes at least one processing unit 1306 and memory 1308. Depending on the exact configuration and type of computing device, memory 1308 may be volatile (such as RAM, for example), non-volatile (such as ROM, flash memory, etc., for example) or some combination of the two. This configuration is illustrated in FIG. 13 by dashed line 1304.

In other embodiments, device 1302 may include additional features and/or functionality. For example, device 1302 may also include additional storage (e.g., removable and/or non-removable) including, but not limited to, magnetic storage, optical storage, and the like. Such additional storage is illustrated in FIG. 13 by storage 1310. In one embodiment, computer readable instructions to implement one or more embodiments provided herein may be in storage 1310. Storage 1310 may also store other computer readable instructions to implement an operating system, an application program, and the like. Computer readable instructions may be loaded in memory 1308 for execution by processing unit 1306, for example.

The term "computer readable media" as used herein includes computer storage media. Computer storage media includes volatile and nonvolatile, removable and non-removable media implemented in any method or technology for storage of information such as computer readable instructions or other data. Memory 1308 and storage 1310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1302. Any such computer storage media may be part of device 1302.

Device 1302 may also include communication connection(s) 1316 that allows device 1302 to communicate with other devices. Communication connection(s) 1316 may include, but is not limited to, a modem, a Network Interface Card (NIC), an integrated network interface, a radio frequency transmitter/receiver, an infrared port, a USB connection, or other interfaces for connecting computing device 1302 to other computing devices. Communication connection(s) 1316 may include a wired connection or a wireless connection. Communication connection(s) 1316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1302 may include input device(s) 1314 such as keyboard, mouse, pen, voice input device, touch input device, infrared cameras, video input devices, and/or any other input device. Output device(s) 1312 such as one or more displays, speakers, printers, and/or any other output device may also be included in device 1302. Input device(s)

1314 and output device(s) 1312 may be connected to device 1302 via a wired connection, wireless connection, or any combination thereof. In one embodiment, an input device or an output device from another computing device may be used as input device(s) 1314 or output device(s) 1312 for computing device 1302.

Components of computing device 1302 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1302 may be interconnected by a network. For example, memory 1308 may be comprised of multiple physical memory units located in different physical locations interconnected by a network.

Those skilled in the art will realize that storage devices utilized to store computer readable instructions may be distributed across a network. For example, a computing device 1320 accessible via network 1318 may store computer readable instructions to implement one or more embodiments provided herein. Computing device 1302 may access computing device 1320 and download a part or all of the computer readable instructions for execution. Alternatively, computing device 1302 may download pieces of the computer readable instructions, as needed, or some instructions may be executed at computing device 1302 and some at computing device 1320.

G. TLA+ Specification

FIGS. 14A-K present an example of a TLA+ specification of a consistency level set that may embody some aspects of the techniques presented herein. It is to be appreciated that this TLA+ specification is but one example of a specification that may incorporate some aspects of the techniques presented herein, and that other embodiments and variations may differ from the example TLA+ specification provided herein.

H. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server of a server set that provides access to a data set, the server comprising:
 a processor; and
 memory storing instructions that, when executed by the processor, cause the server to:

define a consistency level set comprising at least one intermediate consistency level that is less strict than a strong consistency level and more strict than an eventual consistency level;

receive a service level agreement that selects an intermediate consistency level from the consistency level set;

select a server configuration of the server that fulfills the intermediate consistency level selected in the service level agreement by receiving a selection of a custom staleness threshold for the intermediate consistency level and applying the custom staleness threshold based at least on a condition of the custom staleness threshold exceeding a measured round-trip duration between the server and a replica of the data set from which a value is read;

detect that a performance characteristic of the data set does not fulfill the intermediate consistency level;

identify a revised consistency level of the consistency level set that is consistent with the performance characteristic; and automatically reconfigure the server according to the revised consistency level.

2. The server of claim 1, wherein:
a value is written to the data set by a set of replicas; and
the strong consistency level provides, for a read query, the value that was last written among all replicas of the set of replicas.

3. The server of claim 2, wherein the consistency level set further comprises the strong consistency level on condition of the value being written among a replica set of replicas that are collectively located within a threshold distance.

4. The server of claim 1, wherein:
the data set is presented as a session that last presented the data set up to a log sequence number; and
the consistency level set further comprises a session consistency level that provides, for a read query applied over the data set, a value that is more recent than the log sequence number.

5. The server of claim 4, wherein:
the session requests the read query while encoding the log sequence number for which the data set was last presented; and
selecting the server configuration further comprises:
configuring the server to encode the log sequence number with the read request.

6. The server of claim 4, wherein selecting the server configuration of the server further comprises:
storing a set of write queries that were requested through the session and applied to the data set; and
sorting the write queries together with the value for presentation during the session.

7. The server of claim 1, wherein:
the value is written to the data set in a sequential order; and
the consistency level set further comprises a prefix consistency level that provides, for a read query applied over the data set, a value that is latest in the sequential order according to a selected time.

8. The server of claim 7, wherein:
the server set further comprises at least two replica sets of replicas within which the value is written, wherein the sequential order within the respective replica sets is monotonic; and
selecting the server configuration for the prefix consistency level further comprises:
configuring the server to read consistently from a selected replica set of the server set.

9. The server of claim 1, wherein:
the value is written to the data set across a set of replicas; and
the strong consistency level provides, for a read query applied over the data set, the value read from any of the replicas.

10. A method of configuring a server set to provide a data set, the method comprising:
defining a consistency level set comprising at least one intermediate consistency level that is less strict than a strong consistency level and more strict than an eventual consistency level;
for the data set, receiving a service level agreement that selects the intermediate consistency level from the consistency level set;
selecting a service configuration that fulfills the intermediate consistency level selected in the service level agreement by receiving a selection of a custom staleness threshold for the intermediate consistency level and applying the custom staleness threshold based at least on a condition of the custom staleness threshold exceeding a measured round-trip duration between the server and a replica of the data set from which a value is read;
allocating and configuring a server of the server set according to the service configuration;
detecting that a performance characteristic of the data set does not fulfill the intermediate consistency level;
identifying a revised consistency level of the consistency level set that is consistent with the performance characteristic; and
automatically reconfiguring the server according to the revised consistency level.

11. The method of claim 10, further comprising:
during provision of the data set by the server, measuring the performance characteristic of the data set that relates to the intermediate consistency level;
comparing the performance characteristic with the intermediate consistency level selected by the service level agreement to verify that the server fulfills the intermediate consistency level; and
responsive to determining that the server fails to fulfill the intermediate consistency level, identifying a deficiency of the intermediate consistency level exhibited by the server.

12. The method of claim 11, wherein reconfiguring the server according to the revised consistency level further comprises: choosing a lower consistency level of the consistency level set that is consistent with the performance characteristic.

13. The method of claim 11, further comprising: reporting the deficiency of the intermediate consistency level to an administrator of the service level agreement.

14. A method of configuring a server set to provide a data set, the method comprising:
defining a consistency set level comprising:
a strong consistency level;
an eventual consistency level; and
a set of intermediate consistency levels comprising:
a bounded staleness intermediate consistency level;
a session consistency level; and
a consistent prefix consistency level;
for the data set, receiving a service level agreement including a consistency level selected from the consistency level set;

selecting a service configuration that fulfills the consistency level selected in the service level agreement by receiving a selection of a custom staleness threshold for the intermediate consistency level and applying the custom staleness threshold based at least on a condition of the custom staleness threshold exceeding a measured round-trip duration between the server and a replica of the data set from which a value is read;

allocating and configuring a server of the server set according to the service configuration;

detecting that a performance characteristic of the data set does not fulfill the consistency level selected in the service level agreement;

identifying a revised consistency level of the consistency level set that is consistent with the performance characteristic; and automatically reconfiguring the server according to the revised consistency level.

15. The method of claim 14, further comprising:

receiving a read query to read a value of the data set, wherein the read query comprises an override request to override the consistency level selected in the service level agreement for the read query; and responsive to the read query and the override request, applying the read query to the data set using a different consistency level than the consistency level selected in the service level agreement.

16. The server of claim 1, where the data set includes one or more of graph data, key/value pairs, documents, and relational databases.

* * * * *